US012395237B2

(12) United States Patent
Muthuraman et al.

(10) Patent No.: US 12,395,237 B2
(45) Date of Patent: Aug. 19, 2025

(54) ASSISTANCE DATA FOR ORIENTING A MOBILE DEVICE FOR SATELLITE-BASED COMMUNICATIONS

(71) Applicant: QUALCOMM Incorporated, San Diego, CA (US)

(72) Inventors: Kannan Muthuraman, Mission Viejo, CA (US); Francesco Grilli, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 394 days.

(21) Appl. No.: 17/813,099

(22) Filed: Jul. 18, 2022

(65) Prior Publication Data

US 2024/0022321 A1  Jan. 18, 2024

(51) Int. Cl.
*H04B 7/19* (2006.01)
*H04B 7/185* (2006.01)

(52) U.S. Cl.
CPC ..... *H04B 7/18547* (2013.01); *H04B 7/18519* (2013.01); *H04B 7/18541* (2013.01); *H04B 7/18556* (2013.01)

(58) Field of Classification Search
CPC ............ H04B 7/18547; H04B 7/18513; H04B 7/18519; H04B 7/18541; H04B 7/18556; H04B 7/1853; H04W 4/025; H04W 4/029
See application file for complete search history.

(56) References Cited

U.S. PATENT DOCUMENTS

| | | | |
|---|---|---|---|
| 5,347,286 A | 9/1994 | Babitch | |
| 5,666,563 A | 9/1997 | Iijima et al. | |
| 5,946,603 A | 8/1999 | Ibanez-Meier et al. | |
| 6,023,242 A | 2/2000 | Dixon | |

(Continued)

FOREIGN PATENT DOCUMENTS

| | | |
|---|---|---|
| CA | 2633051 A1 | 11/2009 |
| CN | 101304582 A | 11/2008 |

(Continued)

OTHER PUBLICATIONS

Apple: "On GNSS Measurement for NTN", 3GPP TSG-RAN4 Meeting #98bis-e, R4-2104834, 3rd Generation Partnership Project, Mobile Competence Centre, 650, Route Des Lucioles, F-06921 Sophia-Antipolis Cedex, France, vol. RAN WG4, No. Online, Apr. 12, 2021-Apr. 20, 2021 Apr. 2, 2021, 3 Pages, XP052175845, Sections 1 and 2.

(Continued)

*Primary Examiner* — Tuan Pham
(74) *Attorney, Agent, or Firm* — Thien T. Nguyen

(57) ABSTRACT

In some implementations, a device may obtain historical orbital data indicative of orbital movement of a set of satellites over a period of time, the set of satellites comprising at least a subset of satellites of the satellite constellation. The device may, for each satellite in the set of satellites, estimate a set of orbital parameter values by fitting an orbital model to the historical data of the respective satellite, wherein at least one orbital parameter value of the set of orbital values is common across a group of satellites within (Continued)

the set of satellites. The device may send assistance data to at least one mobile device, the assistance data indicative of the respective set of orbital parameter values for all satellites of the set of satellites.

30 Claims, 14 Drawing Sheets

(56) References Cited

U.S. PATENT DOCUMENTS

| | | | |
|---|---|---|---|
| 6,070,051 A | 5/2000 | Astrom et al. | |
| 6,107,959 A | 8/2000 | Levanon | |
| 6,272,316 B1 | 8/2001 | Wiedeman et al. | |
| 6,539,200 B1 | 3/2003 | Schiff | |
| 6,829,534 B2 | 12/2004 | Fuchs et al. | |
| 7,158,080 B2 | 1/2007 | Van | |
| 7,595,752 B2 | 9/2009 | Van et al. | |
| 7,719,464 B2 | 5/2010 | Pande et al. | |
| 7,839,324 B2 | 11/2010 | Phatak et al. | |
| 7,944,395 B1 | 5/2011 | Curticapean et al. | |
| 8,099,103 B2 | 1/2012 | Sung et al. | |
| 8,134,500 B2 | 3/2012 | Van Diggelen et al. | |
| 8,238,903 B2 | 8/2012 | Korb et al. | |
| 8,259,011 B2 | 9/2012 | McBurney et al. | |
| 8,480,036 B2 | 7/2013 | Korb et al. | |
| 8,643,541 B2 | 2/2014 | Van Diggelen et al. | |
| RE45,545 E | 6/2015 | Sung et al. | |
| 9,503,177 B1 | 11/2016 | Shi et al. | |
| 9,893,799 B2 | 2/2018 | Reis | |
| 10,564,292 B2 * | 2/2020 | Rautalin | G01S 19/40 |
| 10,849,034 B1 | 11/2020 | Chisu et al. | |
| 10,924,180 B2 * | 2/2021 | Bournes | H04B 7/195 |
| 11,096,188 B1 | 8/2021 | Vasisht et al. | |
| 11,294,096 B2 | 4/2022 | Elkabetz et al. | |
| 11,811,432 B2 | 11/2023 | Edge | |
| 11,997,593 B2 | 5/2024 | Liberg et al. | |
| 12,063,099 B2 | 8/2024 | Xu et al. | |
| 2002/0190898 A1 | 12/2002 | Abraham et al. | |
| 2003/0029969 A1 | 2/2003 | Turner | |
| 2003/0058161 A1 | 3/2003 | Ring | |
| 2003/0100333 A1 | 5/2003 | Standke et al. | |
| 2003/0122706 A1 | 7/2003 | Choi et al. | |
| 2003/0151547 A1 | 8/2003 | Mauro et al. | |
| 2005/0104772 A1 | 5/2005 | Diggelen et al. | |
| 2008/0150796 A1 | 6/2008 | Syrjarinne et al. | |
| 2011/0291902 A1 | 12/2011 | Bafrooei et al. | |
| 2012/0182179 A1 | 7/2012 | Bamberger et al. | |
| 2013/0135146 A1 | 5/2013 | Ransom et al. | |
| 2014/0132447 A1 | 5/2014 | Derbez et al. | |
| 2015/0006099 A1 | 1/2015 | Pham et al. | |
| 2017/0026110 A1 | 1/2017 | Richardson et al. | |
| 2017/0085314 A1 | 3/2017 | Davis | |
| 2017/0310382 A1 | 10/2017 | Darby, III | |
| 2017/0331170 A1 | 11/2017 | Trerise | |
| 2018/0100932 A1 | 4/2018 | Draaijer et al. | |
| 2018/0206109 A1 | 7/2018 | Bitra et al. | |
| 2018/0270000 A1 | 9/2018 | Reis et al. | |
| 2018/0316401 A1 | 11/2018 | Reis et al. | |
| 2018/0316416 A1 | 11/2018 | Reis et al. | |
| 2018/0316885 A1 | 11/2018 | Reis et al. | |
| 2018/0367212 A1 | 12/2018 | Reis et al. | |
| 2020/0007209 A1 | 1/2020 | Kang | |
| 2020/0044725 A1 | 2/2020 | Breynaert et al. | |
| 2020/0204250 A1 * | 6/2020 | Ravishankar | H04B 7/18541 |
| 2021/0051619 A1 | 2/2021 | Gulati et al. | |
| 2021/0124057 A1 | 4/2021 | Luo et al. | |
| 2021/0242934 A1 | 8/2021 | Qiao et al. | |
| 2021/0311157 A1 | 10/2021 | Takahashi | |
| 2022/0182892 A1 | 6/2022 | Chen et al. | |
| 2022/0291394 A1 | 9/2022 | Lee et al. | |
| 2022/0390618 A1 | 12/2022 | Lavi et al. | |
| 2023/0024479 A1 | 1/2023 | Ciochina et al. | |
| 2023/0063173 A1 | 3/2023 | Caro et al. | |
| 2023/0065219 A1 | 3/2023 | Caro et al. | |
| 2023/0066232 A1 | 3/2023 | Caro et al. | |
| 2023/0336856 A1 | 10/2023 | Park et al. | |
| 2024/0045079 A1 | 2/2024 | Muthuraman et al. | |
| 2024/0048651 A1 | 2/2024 | Lin et al. | |
| 2024/0063893 A1 | 2/2024 | Grilli et al. | |
| 2024/0063894 A1 | 2/2024 | Vogedes et al. | |
| 2024/0063928 A1 | 2/2024 | Bhawnani et al. | |
| 2024/0072887 A1 | 2/2024 | Xiong et al. | |
| 2024/0097778 A1 | 3/2024 | Han et al. | |
| 2024/0162977 A1 | 5/2024 | Muthuraman et al. | |
| 2024/0162979 A1 | 5/2024 | Kies et al. | |
| 2024/0163708 A1 | 5/2024 | Kumar et al. | |
| 2024/0163833 A1 | 5/2024 | Han et al. | |
| 2024/0205874 A1 | 6/2024 | Xiong | |
| 2024/0422523 A1 | 12/2024 | Grilli et al. | |

FOREIGN PATENT DOCUMENTS

| | | |
|---|---|---|
| CN | 101938287 A | 1/2011 |
| CN | 109639337 A | 4/2019 |
| CN | 112737661 A | 4/2021 |
| CN | 113055072 A | 6/2021 |
| CN | 113300757 A | 8/2021 |
| CN | 113328784 A | 8/2021 |
| EP | 0963061 A2 | 12/1999 |
| EP | 4002719 A1 | 5/2022 |
| EP | 4221383 A1 | 8/2023 |
| WO | 2018112502 A1 | 6/2018 |
| WO | 2020051508 A1 | 3/2020 |
| WO | 2020132201 A1 | 6/2020 |
| WO | 2022117339 A1 | 6/2022 |
| WO | 2022147664 A1 | 7/2022 |
| WO | 2022157735 A1 | 7/2022 |
| WO | 2022232963 A1 | 11/2022 |

OTHER PUBLICATIONS

CMCC: "Discussion on Improved GNSS Operations for IoT NTN", 3GPP TSG RAN WG1 #109-e, R1-2204330, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, Apr. 29, 2022, 5 Pages, XP052153493, Section 2.

D4 Thales: "Satellite and Terrestrial Network for 5G (761413), D4.4 Harmonisation of SATCOM with 5G Control and User planes Contractual Delivery Date M27 (Final)", Dec. 1, 2019, pp. 1-201, XP055743394, Section 5.

Inter Digital Inc: "GNSS Acquisition and Reporting for IoT NTN", 3GPP RAN WG1 Meeting #110bis-e, R1-2209645, 3rd Generation Partnership Project, Mobile Competence Centre, 650, Route Des Lucioles, F-06921 Sophia-Antipolis Cedex, France, vol. RAN WG1, No. eMeeting, Oct. 10, 2022-Oct. 19, 2022, Sep. 30, 2022, 4 Pages, XP052259118, R1-2209645, Section 2.

X Sai., et al., "Envisioning Intelligent Reflecting Surface Empowered Space-air-ground Integrated Network", IEEE Network, IEEE Service Center, New York, NY, US, vol. 35, No. 6, Dec. 21, 2021, pp. 225-232, XP011898408, Abstract, section, Advanted Beamforming Design.

Lines T., et al., "3D Map Creation Using Crowdsourced GNSS Data", Computers, Environment and Urban Systems, New York, NY, US, vol. 89, Jun. 19, 2021, pp. 1-14, XP086732227, From p. 1, "Abstract" to end of section 4 "GNSS-mapping algorithm", p. 12, figures 1,2,3.

Takahashi M., "An Effective Satellite Handover System in Future-Oriented Vehicular Communication Society on Collaborative GPS Archive with Distributed Sensors", 2006 10th IEEE Singapore International Conference on Communication Systems (ICCS), IEEE, PI, Oct. 1, 2006, 5 Pages, XP031042156, From "Abstract" to end of section 2.3 "Output of the Receiver", p. 1-p. 2, figure 1, From section 3 "Frameworks and results" from end of section 3.3 "Visibility duration histogram", p. 3-p. 4, figures 5,6, Section 5 "Conclusion", p. 5.

LG Electronics Inc: "Contents of Ephemeris Including Beam Type Information", 3GPP TSG-RAN WG2 Meeting #113bis-e, R2-2103307,

(56) References Cited

OTHER PUBLICATIONS

3rd Generation Partnership Project (3GPP), Mobile Competence Centre, 650, Route Des Lucioles, F-06921 Sophia-Antipolis Cedex, France, vol. RAN WG2, No. Online, Apr. 12, 2021-Apr. 20, 2021, Apr. 2, 2021, 5 Pages, XP052174891, section 2, in special sections 2.4, 2.5.
Thales: "Idle Mode Procedures in NR NTN", 3GPP TSG-RAN WG2 Meeting #112-e, R2-2009255, 3rd Generation Partnership Project (3GPP), Mobile Competence Centre, 650, Route Des Lucioles, F-06921 Sophia-Antipolis Cedex, France, vol. RAN WG2, No. Online, Nov. 2, 2020-Nov. 13, 2020, Oct. 21, 2020, 6 Pages, XP052362309, Section 3.2.
International Search Report and Written Opinion—PCT/US2023/023159—ISA/EPO—Sep. 18, 2023.

\* cited by examiner

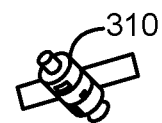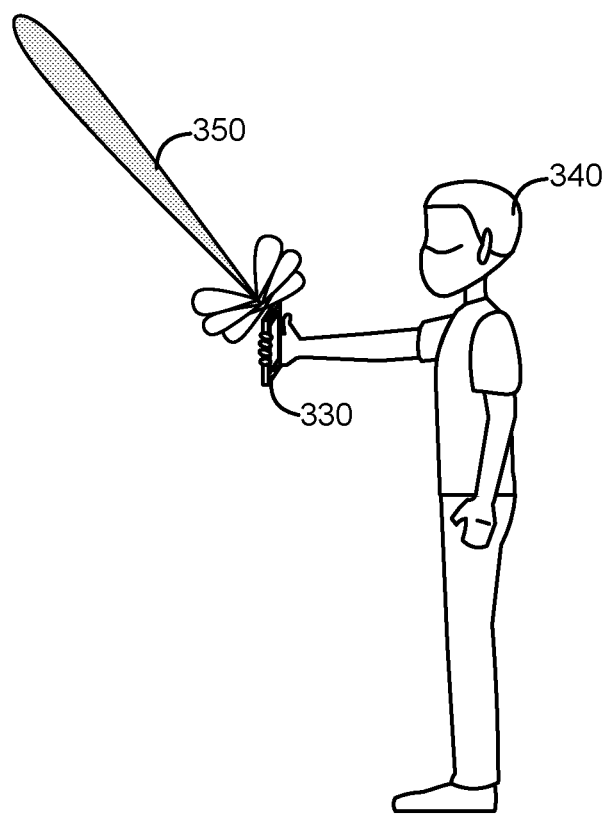
FIG. 3

Step 1: Estimation process flow

Step 2: Estimation process flow

| Plane No | Slot No | Reference epoch time (UTC) | square-root of semimajor axis [sqrt-m] | Eccentricity [no units] | Mean anomaly [rad] | Inclination angle [rad] | RAAN [rad] | RAAN rate [rad/s] | Argument of perigee [rad] |
|---|---|---|---|---|---|---|---|---|---|
| 1 | 1 | 12/30/2020 17:10:18 | 2675.5975032 | 1.27204E-03 | -1.930337 | 1.5078989 | -0.9066168 | -8.44120E-08 | 1.5160931 |
| 1 | 2 | 12/30/2020 17:10:18 | 2675.5975788 | 1.26700E-03 | -2.543273 | 1.5079065 | -0.9056377 | -8.44019E-08 | 1.5572974 |
| 1 | 3 | 12/30/2020 17:10:18 | 2675.5974448 | 1.32249E-03 | -3.129513 | 1.5079014 | -0.9062595 | -8.44098E-08 | 1.5728633 |
| 1 | 4 | 12/30/2020 17:10:18 | 2675.5976186 | 1.23851E-03 | 2.571279 | 1.5079011 | -0.9060693 | -8.44091E-08 | 1.5840094 |
| 1 | 5 | 12/30/2020 17:10:18 | 2675.5977593 | 1.27058E-03 | 1.997795 | 1.5079004 | -0.9058177 | -8.44108E-08 | 1.5855347 |
| 1 | 6 | 12/30/2020 17:10:18 | 2675.5973880 | 1.25733E-03 | 1.370605 | 1.5079031 | -0.9062302 | -8.44068E-08 | 1.6424170 |
| 1 | 7 | 12/30/2020 17:10:18 | 2675.5976224 | 1.28024E-03 | 0.861388 | 1.5078975 | -0.9064619 | -8.44132E-08 | 1.5799323 |
| 1 | 8 | 12/30/2020 17:10:18 | 2675.5974916 | 1.27853E-03 | 0.300576 | 1.5078963 | -0.9066648 | -8.44146E-08 | 1.5699421 |
| 1 | 9 | 12/30/2020 17:10:18 | 2675.5974980 | 1.25499E-03 | -0.269670 | 1.5078989 | -0.9063219 | -8.44116E-08 | 1.5688381 |
| 1 | 10 | 12/30/2020 17:10:18 | 2675.5975022 | 1.25588E-03 | -0.856440 | 1.5078957 | -0.9067195 | -8.44156E-08 | 1.5841629 |
| 1 | 11 | 12/30/2020 17:10:18 | 2675.5975037 | 1.23449E-03 | -1.444489 | 1.5079006 | -0.9065076 | -8.44099E-08 | 1.6012460 |
| 2 | 1 | 12/30/2020 17:10:18 | 2675.5977098 | 1.27342E-03 | -2.310420 | 1.5078740 | -0.3548720 | -8.44291E-08 | 1.5874090 |
| 2 | 2 | 12/30/2020 17:10:18 | 2675.5977037 | 1.23558E-03 | -2.895310 | 1.5078669 | -0.3549334 | -8.44372E-08 | 1.6008851 |
| 2 | 3 | 12/30/2020 17:10:18 | 2675.5973781 | 1.22372E-03 | 2.830550 | 1.5078767 | -0.3538868 | -8.44248E-08 | 1.5882591 |
| 2 | 4 | 12/30/2020 17:10:18 | 2675.5976521 | 1.23028E-03 | 2.261603 | 1.5078684 | -0.3547299 | -8.44372E-08 | 1.5852053 |
| 2 | 5 | 12/30/2020 17:10:18 | 2675.5975590 | 1.25233E-03 | 1.707731 | 1.5078695 | -0.3548944 | -8.44354E-08 | 1.5681504 |
| 2 | 6 | 12/30/2020 17:10:18 | 2675.5973102 | 1.22449E-03 | 1.121282 | 1.5078707 | -0.3545251 | -8.44334E-08 | 1.5844645 |
| 2 | 7 | 12/30/2020 17:10:18 | 2675.5972292 | 1.26933E-03 | 0.524771 | 1.5078592 | -0.3536266 | -8.44479E-08 | 1.6095974 |
| 2 | 8 | 12/30/2020 17:10:18 | 2675.5972818 | 1.26550E-03 | -0.045359 | 1.5078789 | -0.3543413 | -8.44216E-08 | 1.6084517 |
| 2 | 9 | 12/30/2020 17:10:18 | 2675.5974756 | 1.25315E-03 | -0.610902 | 1.5078513 | -0.3570717 | -8.44596E-08 | 1.6021373 |
| 2 | 10 | 12/30/2020 17:10:18 | 2675.5977651 | 1.24555E-03 | -1.177091 | 1.5078827 | -0.3533421 | -8.44175E-08 | 1.5965761 |
| 2 | 11 | 12/30/2020 17:10:18 | 2675.5976502 | 1.25611E-03 | -1.754427 | 1.5078785 | -0.3540126 | -8.44226E-08 | 1.6028179 |

Rows 1–11: Orbital Plane 1; Rows 12–22: Orbital Plane 2

FIG. 9

| Plane No | Slot No | Reference epoch time (UTC) | square-root of semimajor axis [sqrt-m] | Eccentricity [no units] | Mean anomaly [rad] | Inclination angle [rad] | RAAN [rad] | RAAN rate [rad/s] | Argument of perigee [rad] |
|---|---|---|---|---|---|---|---|---|---|
| 1 | 1 | 12/30/2020 17:10:18 | 2675.597362 | 0.00127204 | -1.9291595 | 1.5078507 | -0.9059971 | -8.44120E-08 | 1.5160931 |
| 1 | 2 | 12/30/2020 17:10:18 | 2675.597362 | 0.00126700 | -2.5421632 | 1.5078507 | -0.9059971 | -8.44019E-08 | 1.5572974 |
| 1 | 3 | 12/30/2020 17:10:18 | 2675.597362 | 0.00132249 | -3.1284371 | 1.5078507 | -0.9059971 | -8.44098E-08 | 1.5728633 |
| 1 | 4 | 12/30/2020 17:10:18 | 2675.597362 | 0.00123851 | 2.5718508 | 1.5078507 | -0.9059971 | -8.44091E-08 | 1.5840094 |
| 1 | 5 | 12/30/2020 17:10:18 | 2675.597362 | 0.00127058 | 1.9992739 | 1.5078507 | -0.9059971 | -8.44108E-08 | 1.5855347 |
| 1 | 6 | 12/30/2020 17:10:18 | 2675.597362 | 0.00125733 | 1.3717107 | 1.5078507 | -0.9059971 | -8.44068E-08 | 1.6424170 |
| 1 | 7 | 12/30/2020 17:10:18 | 2675.597362 | 0.00128024 | 0.8625797 | 1.5078507 | -0.9059971 | -8.44132E-08 | 1.5799323 |
| 1 | 8 | 12/30/2020 17:10:18 | 2675.597362 | 0.00127853 | 0.3016023 | 1.5078507 | -0.9059971 | -8.44146E-08 | 1.5699421 |
| 1 | 9 | 12/30/2020 17:10:18 | 2675.597362 | 0.00125499 | -0.2681919 | 1.5078507 | -0.9059971 | -8.44116E-08 | 1.5688381 |
| 1 | 10 | 12/30/2020 17:10:18 | 2675.597362 | 0.00125588 | -0.8550855 | 1.5078507 | -0.9059971 | -8.44156E-08 | 1.5841629 |
| 1 | 11 | 12/30/2020 17:10:18 | 2675.597362 | 0.00123449 | -1.4442071 | 1.5078507 | -0.9059971 | -8.44099E-08 | 1.6012460 |
| 2 | 1 | 12/30/2020 17:10:18 | 2675.597362 | 0.00127342 | -2.3092359 | 1.5078600 | -0.3543433 | -8.44291E-08 | 1.5874090 |
| 2 | 2 | 12/30/2020 17:10:18 | 2675.597362 | 0.00123558 | -2.8937424 | 1.5078600 | -0.3543433 | -8.44372E-08 | 1.6008851 |
| 2 | 3 | 12/30/2020 17:10:18 | 2675.597362 | 0.00122372 | 2.8308842 | 1.5078600 | -0.3543433 | -8.44248E-08 | 1.5882591 |
| 2 | 4 | 12/30/2020 17:10:18 | 2675.597362 | 0.00123028 | 2.2627651 | 1.5078600 | -0.3543433 | -8.44372E-08 | 1.5852053 |
| 2 | 5 | 12/30/2020 17:10:18 | 2675.597362 | 0.00125233 | 1.7084616 | 1.5078600 | -0.3543433 | -8.44354E-08 | 1.5681504 |
| 2 | 6 | 12/30/2020 17:10:18 | 2675.597362 | 0.00122449 | 1.1215379 | 1.5078600 | -0.3543433 | -8.44334E-08 | 1.5844645 |
| 2 | 7 | 12/30/2020 17:10:18 | 2675.597362 | 0.00126933 | 0.5248238 | 1.5078600 | -0.3543433 | -8.44479E-08 | 1.6095974 |
| 2 | 8 | 12/30/2020 17:10:18 | 2675.597362 | 0.00126550 | -0.0454044 | 1.5078600 | -0.3543433 | -8.44216E-08 | 1.6084517 |
| 2 | 9 | 12/30/2020 17:10:18 | 2675.597362 | 0.00125315 | -0.6104395 | 1.5078600 | -0.3543433 | -8.44596E-08 | 1.6021373 |
| 2 | 10 | 12/30/2020 17:10:18 | 2675.597362 | 0.00124555 | -1.1752642 | 1.5078600 | -0.3543433 | -8.44175E-08 | 1.5965761 |
| 2 | 11 | 12/30/2020 17:10:18 | 2675.597362 | 0.0012561 | -1.7527894 | 1.5078600 | -0.3543433 | -8.44226E-08 | 1.6028179 |

Rows with Plane No = 1 correspond to Orbital Plane 1; rows with Plane No = 2 correspond to Orbital Plane 2.

FIG. 10

| Plane No | Slot No | Reference epoch time (UTC) | square-root of semimajor axis [sqrt-m] | Eccentricity [no units] | Mean anomaly [rad] | Inclination angle [rad] | RAAN [rad] | RAAN rate [rad/s] | Argument of perigee [rad] |
|---|---|---|---|---|---|---|---|---|---|
| 1 | 1 | 12/30/2020 17:10:18 | 2675.597362 | 0.00127204 | -1.9291205 | 1.5078989 | -0.9066168 | -8.44120E-08 | 1.5160931 |
| 1 | 2 | 12/30/2020 17:10:18 | 2675.597362 | 0.00126700 | -2.5421858 | 1.5079065 | -0.9056377 | -8.44019E-08 | 1.5572974 |
| 1 | 3 | 12/30/2020 17:10:18 | 2675.597362 | 0.00132249 | -3.1284206 | 1.5079014 | -0.9062595 | -8.44098E-08 | 1.5728633 |
| 1 | 4 | 12/30/2020 17:10:18 | 2675.597362 | 0.00123851 | 2.5718553 | 1.5079011 | -0.9060693 | -8.44091E-08 | 1.5840094 |
| 1 | 5 | 12/30/2020 17:10:18 | 2675.597362 | 0.00127058 | 1.9992627 | 1.5079004 | -0.9058177 | -8.44108E-08 | 1.5855347 |
| 1 | 6 | 12/30/2020 17:10:18 | 2675.597362 | 0.00125733 | 1.3717254 | 1.5079031 | -0.9062302 | -8.44068E-08 | 1.6424170 |
| 1 | 7 | 12/30/2020 17:10:18 | 2675.597362 | 0.00128024 | 0.8626089 | 1.5078975 | -0.9064619 | -8.44132E-08 | 1.5799323 |
| 1 | 8 | 12/30/2020 17:10:18 | 2675.597362 | 0.00127853 | 0.3016443 | 1.5078963 | -0.9066648 | -8.44146E-08 | 1.5699421 |
| 1 | 9 | 12/30/2020 17:10:18 | 2675.597362 | 0.00125499 | -0.2681715 | 1.5078989 | -0.9063219 | -8.44116E-08 | 1.5688381 |
| 1 | 10 | 12/30/2020 17:10:18 | 2675.597362 | 0.00125588 | -0.8550400 | 1.5078957 | -0.9067195 | -8.44156E-08 | 1.5841629 |
| 1 | 11 | 12/30/2020 17:10:18 | 2675.597362 | 0.00123449 | -1.4441749 | 1.5079006 | -0.9065076 | -8.44099E-08 | 1.6012460 |
| 2 | 1 | 12/30/2020 17:10:18 | 2675.597362 | 0.00127342 | -2.3092026 | 1.5078740 | -0.3548720 | -8.44291E-08 | 1.5874090 |
| 2 | 2 | 12/30/2020 17:10:18 | 2675.597362 | 0.00123558 | -2.8937053 | 1.5078669 | -0.3549334 | -8.44372E-08 | 1.6008851 |
| 2 | 3 | 12/30/2020 17:10:18 | 2675.597362 | 0.00122372 | 2.8308555 | 1.5078767 | -0.3538868 | -8.44248E-08 | 1.5882591 |
| 2 | 4 | 12/30/2020 17:10:18 | 2675.597362 | 0.00123028 | 2.2627894 | 1.5078684 | -0.3547299 | -8.44372E-08 | 1.5852053 |
| 2 | 5 | 12/30/2020 17:10:18 | 2675.597362 | 0.00125233 | 1.7084962 | 1.5078695 | -0.3548944 | -8.44354E-08 | 1.5681504 |
| 2 | 6 | 12/30/2020 17:10:18 | 2675.597362 | 0.00122449 | 1.1215493 | 1.5078707 | -0.3545251 | -8.44334E-08 | 1.5844645 |
| 2 | 7 | 12/30/2020 17:10:18 | 2675.597362 | 0.00126933 | 0.5247787 | 1.5078592 | -0.3536266 | -8.44479E-08 | 1.6095974 |
| 2 | 8 | 12/30/2020 17:10:18 | 2675.597362 | 0.00126550 | -0.0454045 | 1.5078789 | -0.3543413 | -8.44216E-08 | 1.6084517 |
| 2 | 9 | 12/30/2020 17:10:18 | 2675.597362 | 0.00125315 | -0.6102679 | 1.5078513 | -0.3570717 | -8.44596E-08 | 1.6021373 |
| 2 | 10 | 12/30/2020 17:10:18 | 2675.597362 | 0.00124555 | -1.1753271 | 1.5078827 | -0.3533421 | -8.44175E-08 | 1.5965761 |
| 2 | 11 | 12/30/2020 17:10:18 | 2675.597362 | 0.00125611 | -1.7528102 | 1.5078785 | -0.3540126 | -8.44226E-08 | 1.6028179 |

FIG. 11

ASSISTANCE DATA FOR ORIENTING A MOBILE DEVICE FOR SATELLITE-BASED COMMUNICATIONS

BACKGROUND

1. Field of Disclosure

The present disclosure relates generally to the field of wireless communications, and more specifically to enabling a mobile device (e.g., a cellular phone) to communicate using satellite-based communications.

2. Description of Related Art

Satellite-based communications in the past have been limited to satellite phones having specialized antennas to enable the satellite phone to effectively send and receive signals to and from satellites. As the number of communication satellites increases, so does the possibility of enabling satellite-based communication for other types of devices. However, for non-specialized devices, such as standard mobile phones, such communications may be an impracticality if users are unable to orient mobile phones such that communication satellites fall within the main lobe of the mobile phone antenna. Further, because communication satellites may perform movements within their orbit (e.g., station keeping, to help avoid collisions) determining a location of a communication satellite in real time can be challenging without updating orbital parameters frequently (e.g., once every few weeks).

BRIEF SUMMARY

An example method of facilitating pointing of a mobile device at a satellite of a satellite constellation for satellite-based data communication, according to this disclosure, may comprise obtaining historical orbital data indicative of orbital movement of a set of satellites over a period of time, the set of satellites comprising at least a subset of satellites of the satellite constellation. The method also may comprise, for each satellite in the set of satellites, estimating a set of orbital parameter values by fitting an orbital model to the historical data of the respective satellite, wherein at least one orbital parameter value of the set of orbital values is common across a group of satellites within the set of satellites. The method also may comprise sending assistance data to at least one mobile device, the assistance data indicative of the respective set of orbital parameter values for all satellites of the set of satellites.

An example device for facilitating pointing of a mobile device at a satellite of a satellite constellation for satellite-based data communication, according to this disclosure, may comprise a transceiver, a memory, one or more processors communicatively coupled with the transceiver and the memory, wherein the one or more processors are configured to obtain historical orbital data indicative of orbital movement of a set of satellites over a period of time, the set of satellites comprising at least a subset of satellites of the satellite constellation. The one or more processors further may be configured to, for each satellite in the set of satellites, estimate a set of orbital parameter values by fitting an orbital model to the historical data of the respective satellite, wherein at least one orbital parameter value of the set of orbital values is common across a group of satellites within the set of satellites. The one or more processors further may be configured to send assistance data to at least one mobile device, the assistance data indicative of the respective set of orbital parameter values for all satellites of the set of satellites.

An example apparatus for facilitating pointing of a mobile device at a satellite of a satellite constellation for satellite-based data communication, according to this disclosure, may comprise means for obtaining historical orbital data indicative of orbital movement of a set of satellites over a period of time, the set of satellites comprising at least a subset of satellites of the satellite constellation. The apparatus further may comprise means for estimating, for each satellite in the set of satellites, a set of orbital parameter values by fitting an orbital model to the historical data of the respective satellite, wherein at least one orbital parameter value of the set of orbital values is common across a group of satellites within the set of satellites. The apparatus further may comprise means for sending assistance data to at least one mobile device, the assistance data indicative of the respective set of orbital parameter values for all satellites of the set of satellites.

According to this disclosure, an example non-transitory computer-readable medium stores instructions for facilitating pointing of a mobile device at a satellite of a satellite constellation for satellite-based data communication, the instructions comprising code for obtaining historical orbital data indicative of orbital movement of a set of satellites over a period of time, the set of satellites comprising at least a subset of satellites of the satellite constellation. The instructions further may comprise code for, for each satellite in the set of satellites, estimating a set of orbital parameter values by fitting an orbital model to the historical data of the respective satellite, wherein at least one orbital parameter value of the set of orbital values is common across a group of satellites within the set of satellites. The instructions further may comprise code for sending assistance data to at least one mobile device, the assistance data indicative of the respective set of orbital parameter values for all satellites of the set of satellites.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIG. 3 is a diagram illustrating how satellite-based communications with mobile devices, such as traditional cell phones, can be enabled without specialized antennas for satellite communication.

FIG. 9 is a table illustrating example Keplerian orbital parameter values generated by performing step 1 of the estimation process flow described herein with regard to FIG. 6.

FIG. 10 is a table illustrating a first example set of Keplerian orbital parameter values generated performing step 2 of the estimation process flow described herein with regard to FIG. 7, continuing with the example values of FIG. 9 for generating Keplerian orbital parameter values for satellites.

FIG. 11 is a table illustrating a second example set of Keplerian orbital parameter values generated performing step 2 of the estimation process flow.

Figure 1:
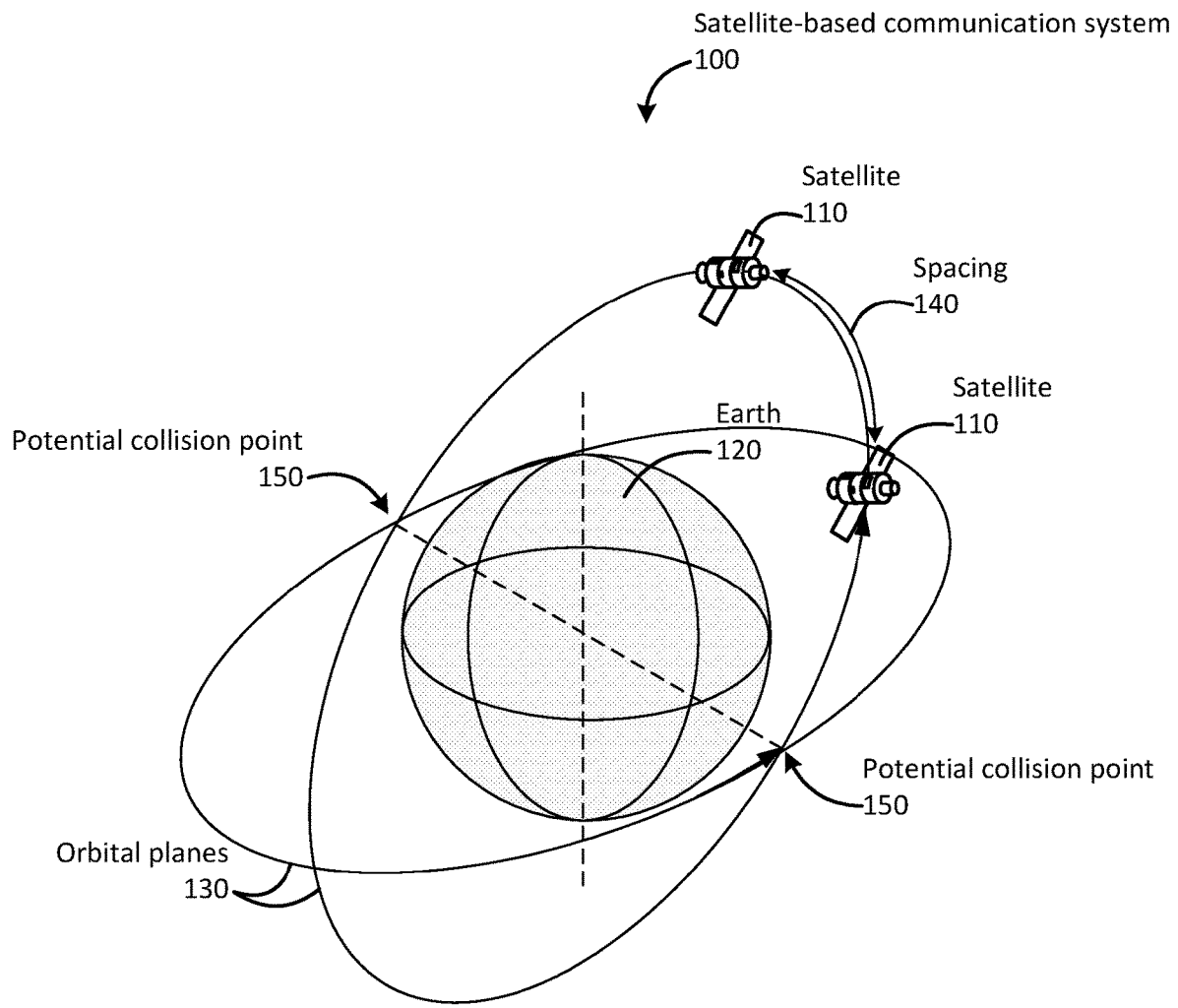
FIG. 1 is a diagram of a satellite-based communication system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative examples will now be described with respect to the accompanying drawings, which form a part hereof. While particular examples, in which one or more aspects of the disclosure may be implemented, are described below, other examples may be used and various modifications may be made without departing from the scope of the disclosure of the appended claims.

Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

As used herein, the terms "mobile device" may comprise a mobile electronic device that may be capable of wireless communications. Although often illustrated as a mobile phone (or "user equipment" (UE) of a cellular network), the wireless communication capabilities of the mobile device are not intended to be specific or otherwise limited to any particular Radio Access Technology (RAT), unless otherwise noted. In general, a mobile device may be any wireless communication device that may be oriented by a user (e.g., a mobile phone, router, tablet computer, laptop computer, tracking device, wearable (e.g., smartwatch, glasses, Augmented Reality (AR)/Virtual Reality (VR) headset, etc.), Internet of Things (IoT) device, etc.), or other electronic device that may be used for Global Navigation Satellite Systems (GNSS) positioning as described herein. According to some embodiments, a mobile device may be used to communicate over a wireless communications network. A mobile device may be mobile or may (e.g., at certain times) be stationary, and may communicate with a terrestrial Radio Access Network (RAN), when in range of the RAN. As used herein, the term mobile device may be referred to interchangeably as a UE, an Access Terminal (AT), a client device, a wireless device, a subscriber device, a subscriber terminal, a subscriber station, a user terminal (UT), a mobile device, a mobile terminal, a mobile station, or variations thereof. Generally, mobile devices can communicate with a core network via a RAN, and through the core network, the mobile devices can be connected with external networks (such as the Internet) and with other mobile devices. Other mechanisms of connecting to the core network and/or the Internet are also possible for the mobile devices, such as over wired access networks, wireless local area network (WLAN) networks (e.g., based on the Institute of Electrical and Electronics Engineers (IEEE) 802.11 standard, etc.), and so on.

As described herein, a GNSS receiver may comprise and/or be incorporated into an electronic device. This may include a single entity or may include multiple entities such as in a personal area network where a user may employ audio, video and/or data I/O devices and/or body sensors and a separate wireline or wireless modem. As described herein, an estimate of a location of the Global Positioning System (GPS) receiver may be referred to as a location, location estimate, location fix, fix, position, position estimate or position fix, and may be geodetic, thus providing location coordinates for the GPS receiver (e.g., latitude and longitude) which may or may not include an altitude component (e.g., height above sea level, height above or depth below ground level, floor level or basement level). In some embodiments, a location of the GPS receiver and/or an electronic device comprising the GPS receiver may also be expressed as an area or volume (defined either geodetically or in civic form) within which the GPS receiver is expected to be located with some probability or confidence level (e.g., 67%, 95%, etc.). In the description contained herein, the use of the term location may comprise any of these variants unless indicated otherwise. When computing the location of a GPS receiver, such computations may solve for local X, Y, and possibly Z coordinates and then, if needed, convert the coordinates from one coordinate frame to another.

Satellite-based communication systems have been increasing in recent years, expanding the coverage of voice-based and date-based communication. This can enable telephone coverage and Internet access to regions not previously covered by terrestrial wireless (e.g., cellular/mobile communication networks) or wired networks (e.g., traditional wired telephone networks, cable, digital subscriber line (DSL), etc.).

FIG. 1 is a diagram of a satellite-based communication system 100 in which satellites 110 orbit the earth 120, traveling along a path in orbital plane 130. For simplicity, the diagram has been greatly simplified. In practical embodiments, satellite-based communication systems 100 may comprise dozens of satellites 110 with many orbital planes 130. The Iridium® communication system, for example, has 66 satellites: 11 satellites in each of six orbital planes. To help optimize communication efficiency, satellites 110 in such satellite-based communication systems 100 are typically equally spaced such that the spacing 140 is approximately the same between all satellites 110 in an orbital plane 130.

At times, satellites 110 may depart from a regular orbit due to controlled maneuvers. For example, at times, satellites 110 may be steered to avoid collisions with other satellites 110 (and/or other objects in space). This can occur, for example, when satellites 100 can from different orbital planes 130 approach potential collision points 150 (where orbital planes 130 intersect) at approximately the same time. (This assumes that satellites 110 in intersecting orbital planes 130 are orbiting the earth 120 at approximately the same altitude, which is common for satellite-based communication systems). Because of this, orbital models that predict location of communication satellites 110 are often unable to accurately predict the location of satellites 110 for a long period of time. For a given satellite 110, steering events may occur every few weeks (Iridium satellites are corrected every 4-7 weeks, approximately). And thus, such orbital models are typically unable to accurately predict the location of the satellite 110 for longer than a few weeks.

Figure 2:
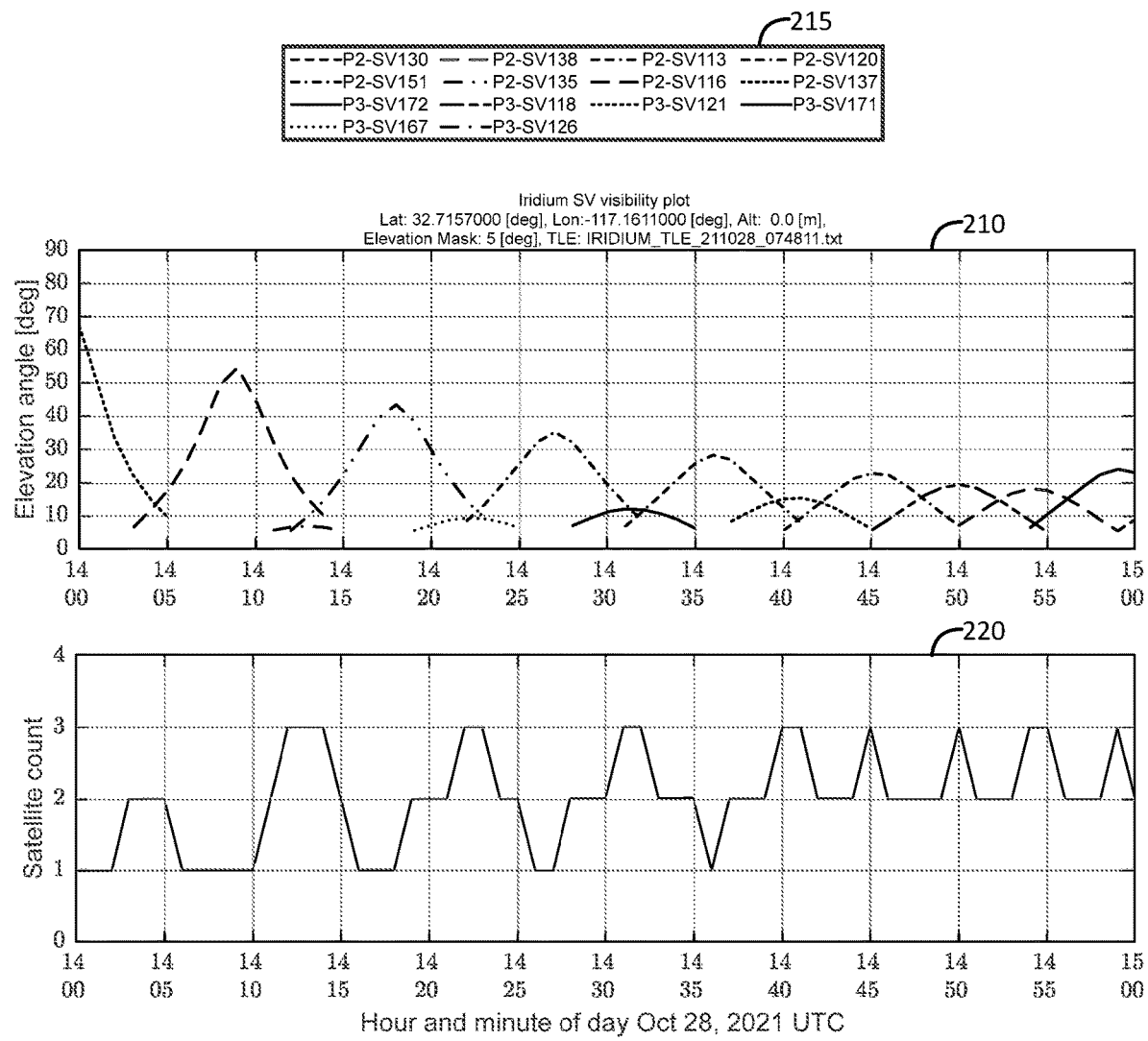
FIG. 2 is a set of graphs showing example visibility and number of satellites that move across the sky over the course of an hour for a constellation of communication satellites.

Satellite-based communication systems, such as the one illustrated in FIG. 1 generally operate satellites within low earth orbit (LEO), in which the altitude of the satellites is 2,000 km or less. That said, some satellite-based communication systems may operate in medium earth orbit (MEO) (with an altitude of approximately 10,000 to 20,000 callers) or geostationary earth orbit (GEO) (with an altitude of approximately 35,786 km). For LEO satellites, this means satellites move much more quickly across the sky, relative to a user on the earth's surface. FIG. 2 helps illustrate this concept.

FIG. 2 is a set of graphs showing example visibility and number of satellites that move across the sky over the course of an hour. This particular example is with respect to the visibility of Iridium NEXT satellites, from a perspective on earth a latitude of 32.7157000° and a longitude of −117.1611000° at sea level. The top chart 210 illustrates the change in elevation of different visible satellites (legend 215 specifies the particular satellites), and the bottom chart 220 indicates the number of satellites visible at any given time. Both charts illustrate how each satellite may be visible for only about 10 minutes. However, the orbits of the satellites (including the spacing between satellites and spacing between orbital planes) are such that at least one satellite is always visible at any given moment. And although different locations may have a different number of visible satellites (e.g., locations near the poles tend to have more visible satellites than locations near the equator), satellite communication systems may be designed to ensure at least one satellite is visible (assuming an open sky scenario) at any time and at any location on earth.

As noted, traditional satellite-based communications for mobile devices often required specialized mobile devices, such as satellite phones, which are typically expensive. However, mobile phone manufacturers and providers have been looking into opportunities for providing satellite communications (if only limited) to more traditional mobile devices, such as traditional cell phones. However, given the limitations of the battery capacity, antennas of traditional cell phones, along with the movement of communications satellites (e.g., LEO satellites) this can be a challenge.

FIG. 3 is a diagram illustrating some of the challenges for enabling satellite-based communications with mobile devices, such as traditional cell phones, without specialized antennas for satellite communication. Here, a satellite 310 may service one or more terrestrial devices by directionally transmitting and receiving signals using one or more RF beams. To engage in satellite-based communications using a mobile device 330, a user 340 may need to orient the mobile device 330 such that the primary antenna node 350 of the mobile device antenna is substantially pointing at the satellite 310.

Once the primary antenna node 350 is pointed at the satellite 310, it may take only a few seconds for the mobile device 330 to establish a communication link with the satellite 310 and transmit/receive data. In some embodiments, such functionality may be provided (e.g., by a mobile carrier) to users or subscribers of a satellite-based communication service to enable users to transmit and/or receive data when not in coverage of a terrestrial wireless network (e.g., cellular network). Data may be sent in emergencies and may comprise an SOS or other emergency message, for example. Additionally or alternatively, text messages may be buffered and sent/received when a communication link is established between the mobile device 330 and satellite 310. Other data and/or voice services may be facilitated using such satellite-based communication.

Such communication, however, relies on the user 340 being able to successfully point the primary antenna node 350 of the mobile device 330 toward the satellite 310. And different factors may make this particularly challenging. Accuracy to which a mobile device 330 with a main node 350 needs to be pointed towards a satellite 310 is a function of error budget available. Error budget is typically a function of antenna main node 350 characteristics. Most of the available error budget is allocated to account for user pointing error, leaving tighter requirements for components described in FIG. 8. For example, the primary antenna node 350 may not be oriented with respect to the mobile device 330 in a manner that makes "pointing" the primary antenna node 350 toward the satellite 310 easy or intuitive. Further, the primary antenna node 350 may be relatively narrow such that 3-5° of error, for example, may impact performance. Additionally, as previously noted, the position and movement of the satellite 310 in the sky may be difficult to accurately predict if the satellite 310 undergoes steering events.

Embodiments herein help address at least some of these issues by providing for accurate modeling of the orbital position of satellites in a satellite-based communication. A model capable of accurately predicting the locations of satellites in a satellite-based communication system for an extended period of time can be created by a server in communication with the mobile device. To help enable a user to correctly orient the mobile device for satellite-based communication, the server can provide assistance data to the mobile device, including the model. The techniques provided herein may be used to provide models capable of accurately predicting the locations of satellites (e.g., within 41 km (or 3° from the perspective of a user on earth) for over a year with 99% ile confidence.

Figure 4:
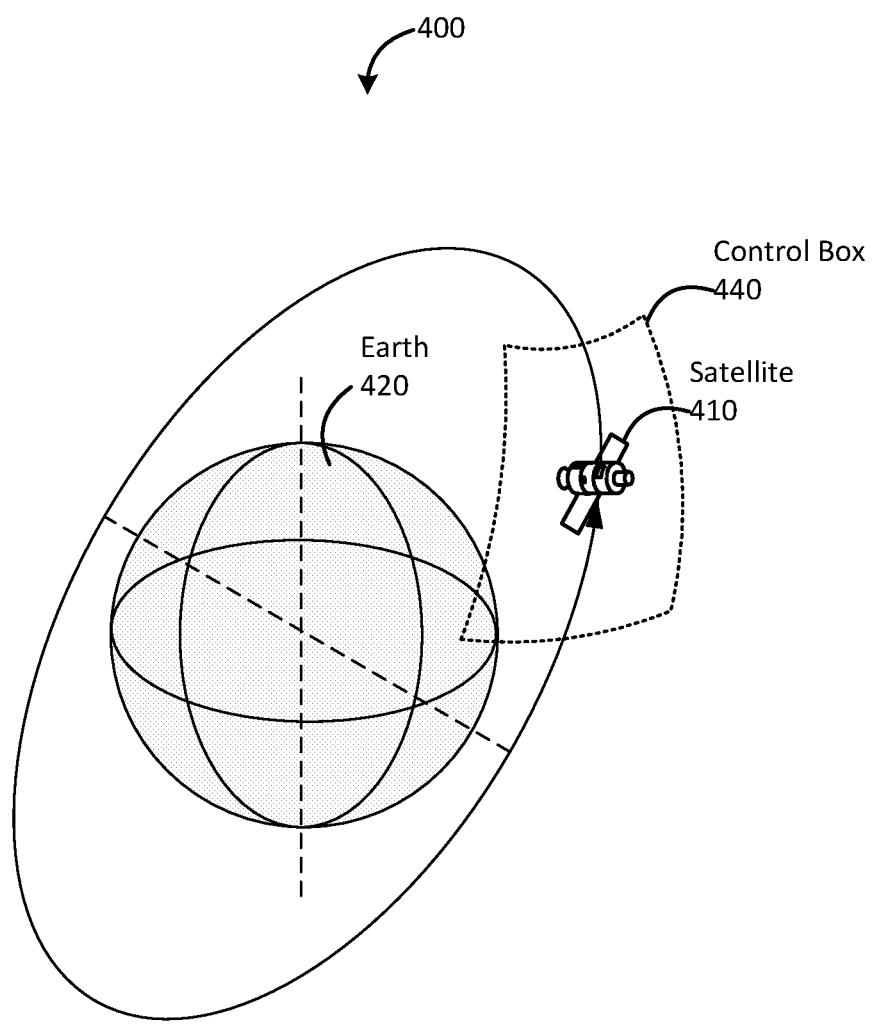
FIG. 4 is a diagram provided to illustrate conceptually what satellite modeling may do to predict the location of a given satellite, according to some embodiments.

FIG. 4 is a diagram 400, similar to FIG. 1, provided to illustrate conceptually what satellite modeling may do to predict the location of a given satellite 410, according to some embodiments. Using standard modeling techniques, traditional satellite modeling may predict a location of the satellite 410, with respect to earth 420, with a certain degree of accuracy. However, these models are typically no longer applicable after a steering event because, when undergoing a steering event in which the satellite 410 temporarily departs from its position in the orbit, the satellite 410 typically does not return to its exact position in the orbit as modelled using standard techniques. Thus, traditional satellite modeling for a given satellite 410 may last only for a few weeks, or until a steering event takes place.

According to embodiments, more robust models can be made by modeling the location of a control box 440 of the satellite 410, rather than the exact location of the satellite 410 itself. A control box 440 of a satellite 410 is a region within which the satellite 410 is typically located. The combination of all control boxes for all satellites of a satellite constellation may be referred to as a reference grid, where each "cell" of the reference grid corresponds to a control box of a satellite. Satellite constellations are typically created and maintained with the idea that although each satellite will may deviate from a normal orbit, it can be controlled to stay within a threshold distance from its predicted location. This is especially true with satellites of a satellite-based communication system (e.g., LEO communication satellites), where, as previously indicated, accurate spacing between satellites is desired. So although a steering event may cause a satellite 410 to temporarily leave its control box 440, the satellite 410 will typically returned to its control box 440. And thus, steering events generally do not impact the location of the control box 440.

Because satellites of a satellite-based communication system have a "tight" control box in (e.g., spanning 10-20 km in width and height), a mobile device may be able to engage in communication with a satellite when the primary antenna node of the mobile device (e.g., primary antenna lobe 350 of FIG. 3) is pointed at a center point of the control box 440, rather than at the actual location of the satellite 410. With this in mind, and because steering events generally do not impact the location of the control box 440, as previously noted, embodiments herein can model the location of the control box 440 (e.g., the center point of the control box 440), providing satellite modeling that enables a user to orient a user device for satellite communication, where (as previously noted) the model can remain accurate for over year, rather than just a few weeks. A detailed description of how this modeling can be performed is provided hereafter.

Figure 5:
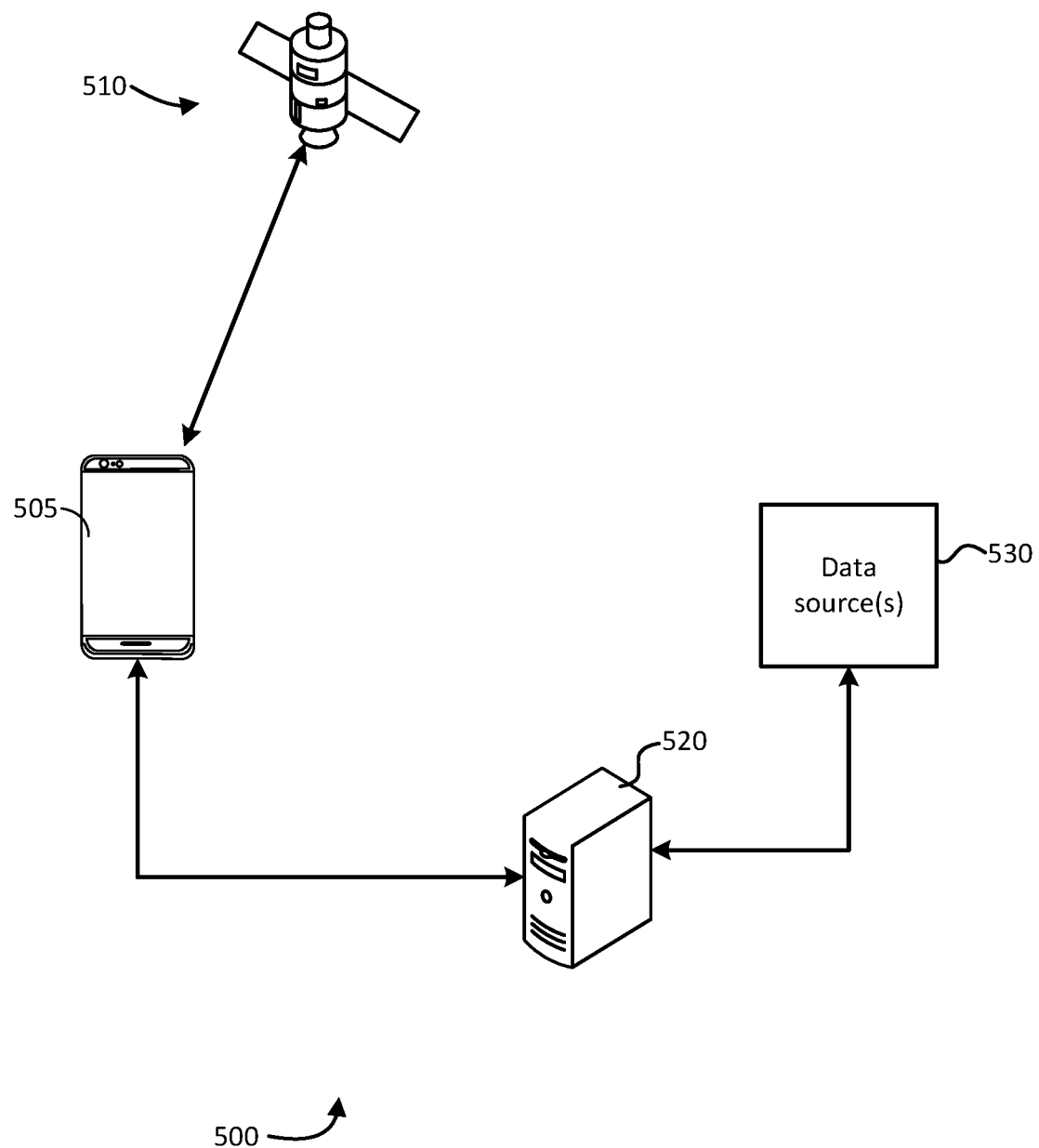
FIG. 5 illustrates an example architecture of a system for providing a mobile device with assistance data to enable a user to orient the mobile device for communicating with the satellite, according to an embodiment.

FIG. 5 illustrates an example architecture 500 of a system for providing a mobile device 505 with assistance data to enable a user to orient the mobile device 505 for satellite-based communications with the satellite 510, according to an embodiment. Arrows represent communication links, which may include one or more intervening devices, networks, etc. (not shown). As with other figures, FIG. 5 is provided as a nonlimiting example, and alternative embodiments may include additional or alternative components for providing assistance data to the mobile device 505.

In the example architecture 500, modeling can be done utilizing a server connected to one or more data sources 530. Here, the server 520 may comprise a computer server hosted in the cloud by a service for modeling satellite trajectory data. The service may be provided, for example, by a satellite-based communication carrier, mobile phone carrier, etc. communication between the server 520 and mobile device 505 may be relayed via one or more wired and/or wireless networks, including the Internet, a wireless cellular network, etc.

The data sources may comprise 530 computer servers and/or other devices providing orbital information regarding satellites (e.g., satellite 510) of a satellite-based communication system. As an example, United States Space Command (USSPACECOM) 18th Space Defense Squadron (18 SPDS) publishes Two Line Element (TLE) data, which can be used with an unclassified Simplified General Perturbations #4 (SGP4) library to derive orbital information, based on radar observations. TLE data is typically published on the Internet several times per day.

Using historical data to accurately model bounding boxes for satellites in a constellation (e.g., using the techniques described hereafter), the server 520 can provide the model to the mobile device 505, enabling the mobile device 505 to determine a position of the satellite 510. With this information, along with an approximate location of the mobile device 505 on earth, the mobile device 505 can determine how it should be oriented in order to communicate with the satellite 510, and can prompt a user (e.g., using a graphical user interface, audio prompts, etc.) to orient the mobile device 505 in that way.

Figure 6:
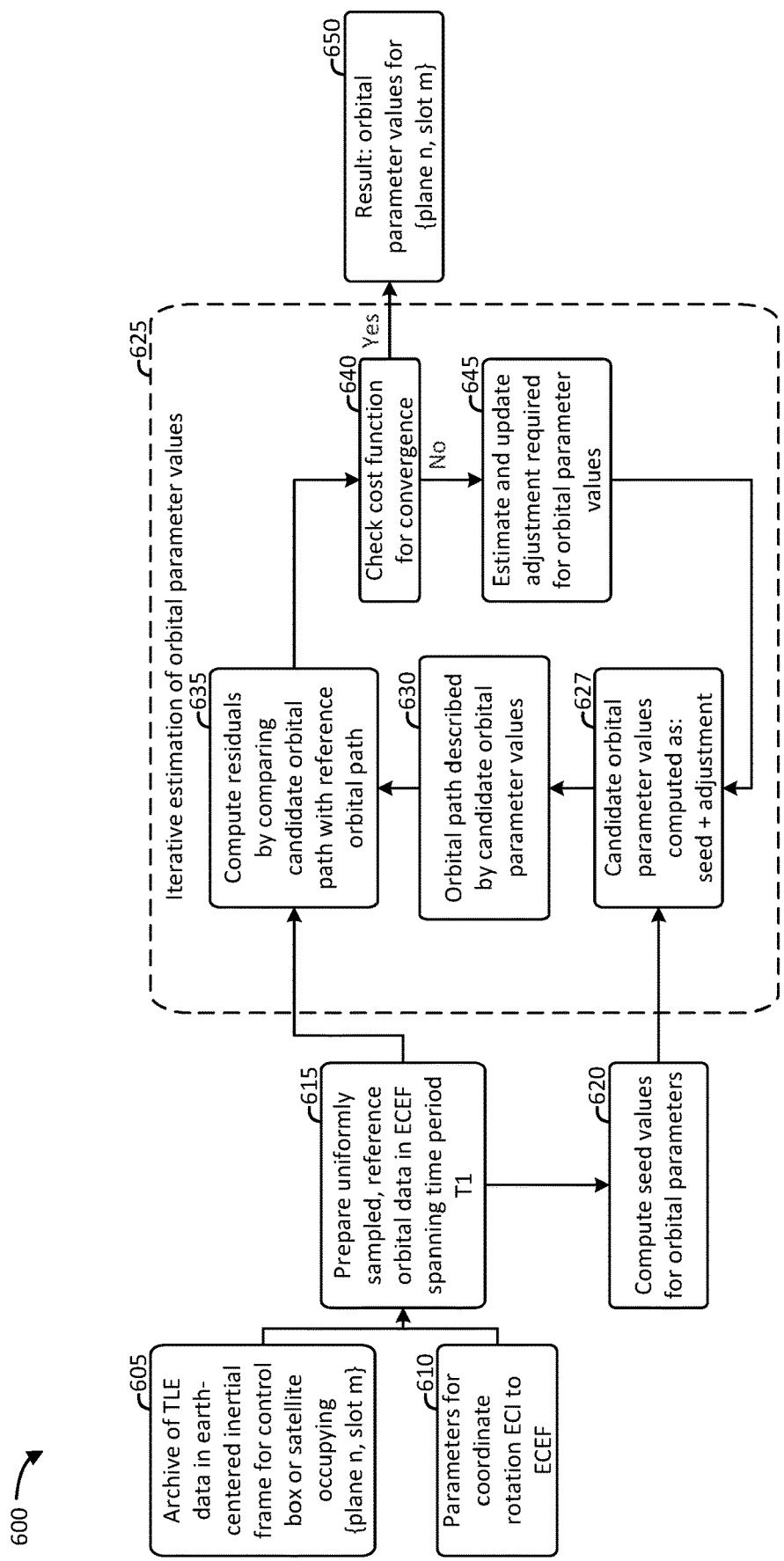
FIG. 6 is a flow diagram illustrating a first process flow, illustrating an initial parameter estimation process for determining an accurate long-term model, according to some embodiments.
Figure 7:
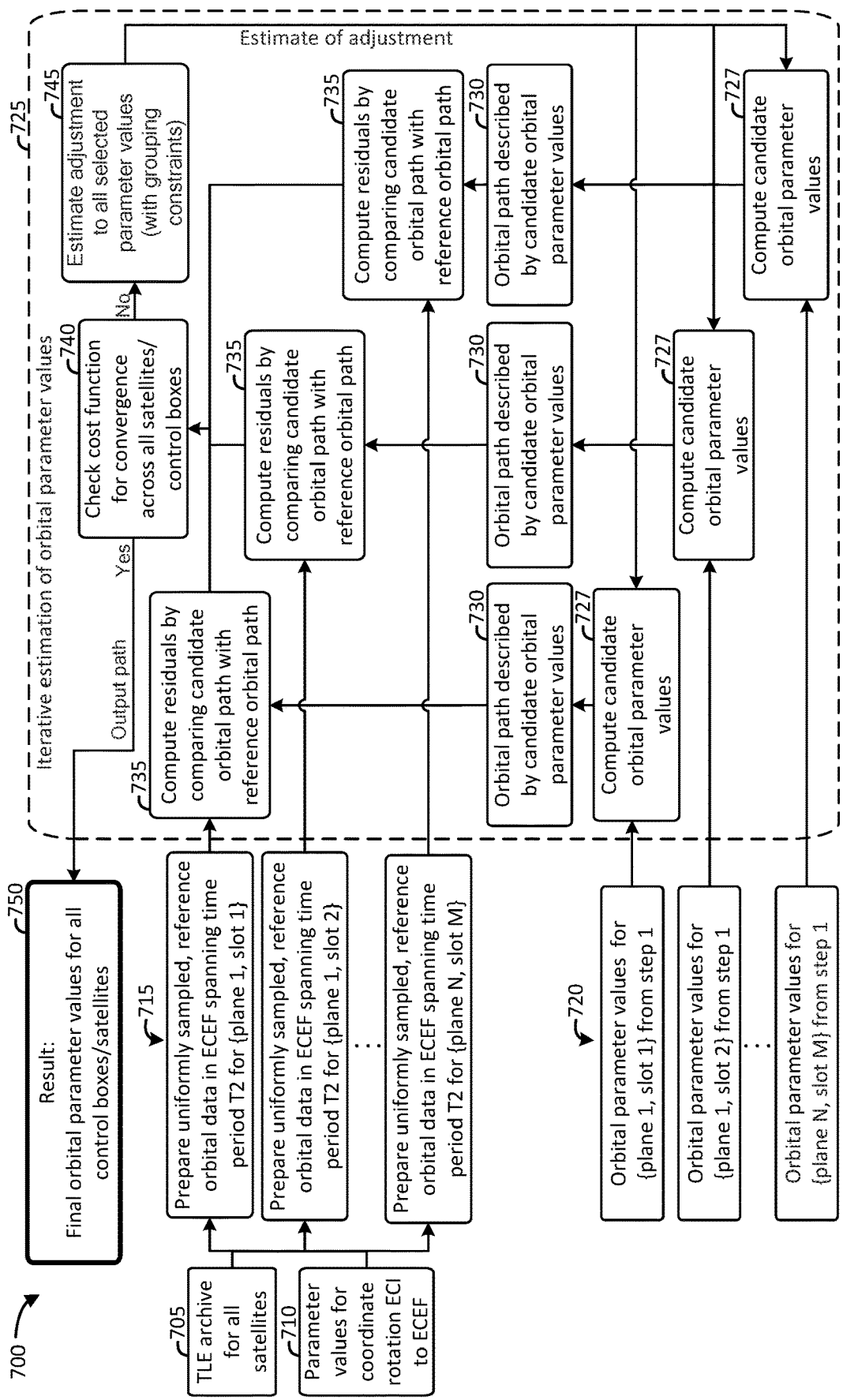
FIG. 7 is a flow diagram illustrating a second process flow, illustrating an subsequent parameter estimation process for determining an accurate long-term model, according to some embodiments, which can follow the initial process illustrated in FIG. 6.

According to embodiments, using historical data to determine an accurate long-term model for predicting the location of a control box can be done in a two-step process, as illustrated in FIGS. 6 and 7. It can be noted that the embodiments illustrated in FIGS. 6 and 7 describe "satellites" and "control boxes" interchangeably, indicating the center of a region (control box) corresponding to a satellite in which the satellite is located.

FIG. 6 is a flow diagram illustrating a first process flow 600, illustrating an initial parameter estimation process for determining an accurate long-term model, according to some embodiments. The operations illustrated in this first process flow 600 (along with the process flow illustrated in FIG. 7 and described hereafter) may be performed by a server (e.g., server 520) to determine a model for satellite control box prediction for all satellites in the constellation. As previously noted, this model may then be provided to UEs as assistance data, enabling a UE to determine the location of the control boxes for UE orientation when engaging in satellite-based communication.

Step 1 can begin using the input provided at blocks 605 and 610. In particular, as previously noted, the server can retrieve the archive of TLE (orbital) data for satellites in a satellite-based communication constellation over a period of time, as indicated at block 605. Each control box or satellite may be given a particular slot in a particular plane, and satellite data for all slots and planes, or a subset thereof, may be obtained.

As further indicated, satellite information may be provided in an earth centered inertial (ECI) reference frame. However, for determining a position of a satellite relative to a UE on the ground, it may be preferable to utilize an earth-centered, earth-fixed (ECEF) frame. Thus, embodiments may further obtain parameters for coordinate rotation from ECI to ECEF, as indicated at block 610.

The amount of historical data used in the first process flow 600 may vary, depending on desired functionality. However, to account for changes to the orbit of a satellite due to a steering event, embodiments may use historical data that spans one or more orbit steering events for each satellite. For example, for Iridium NEXT satellites where each satellite undergoes a steering event every 4-7 weeks, TLE data covering a sampling period of at least 8 weeks can help ensure that each satellite undergoes at least one steering event, thereby making the model to account for steering events for all satellites (and therefore accurately predict satellite location for far longer than traditional models).

At block 615, the process comprises preparing uniformly sampled, reference orbital data in ECEF spanning time period T1. As previously noted, the length of time period T1 may be selected to help ensure a steering event occurs for each satellite for which data is obtained (in the previous example regarding Iridium satellites, T1 would comprise the most recent 8 weeks of data). Preparation of the uniformly sampled orbital data may comprise determining a position (e.g., an x, y, z location) of each satellite at a uniform sampling rate (e.g., every five minutes).

Using the uniformly sampled reference orbital data prepared at block 615, the server can then compute a seed values for orbital parameters, as indicated at block 620. Depending on the type of orbital model used for satellite position estimation, these orbital parameters may vary. For example, for a Keplerian model, the orbital parameters may comprise Keplerian orbital parameters such as square-root of semi-major axis, eccentricity, mean anomaly, inclination angle, Right Ascension of Ascending Node (RAAN), RAAN rate, and argument of perigee, or a combination thereof. Alternatively, equinoctial orbital modeling may be used, in which case the orbital parameters may comprise some or all of the equinoctial element set: semi-major axis, components of eccentricity vector in equinoctial reference frame, components of an ascending node vector in equinoctial reference frame, and mean longitude. In some embodiments, secondary or derived parameters may be used as the orbital parameters. For example, in classical Keplerian orbital modeling, the Keplerian element set can be represented using derived parameters such as orbital time period rather than semi-major axis because there is a direct relation between the two. The seed values may be used to seed the iterative process of estimation of values for orbital parameters performed by the group of operations included in block 625. The seed value may be obtained in any of a variety of ways, depending on desired functionality. In some embodiments, for instance, the seed values can be obtained from the final N epochs of reference orbital data extracted in block 615.

The group of operations in block 625 then iteratively alter parameter values (e.g., starting with the seed values obtained at block 620) to find a set of orbital parameter values that best fits the actual orbital data for period T1. This is done by estimating, for each orbital parameter, a respective adjustment to the respective seed value to determine a respective candidate orbital parameter value, as indicated at block 627. These candidate orbital parameter values are then used to calculate a candidate orbital path, as indicated at block 630. At block 635, the candidate orbital path is then compared with the actual (reference) orbital path from block 615, and residuals indicating a difference between the candidate and actual orbital paths are computed. At block 640, a cost function can be checked for convergence (e.g., whether values of residuals for successive iterations have changed beyond a threshold value). If there has not been convergence, then the process of estimating orbital parameter values can be repeated with updated orbital parameter values, estimated as indicated at block 645. However, once the iteration process results in a convergence (e.g., values of residuals from one iteration to the next do not change beyond a threshold) then the candidate orbital parameter values in the most recent iteration can be used as the output orbital parameter values of the first process flow 600, as indicated at block 650. This first process flow 600 can be conducted, in parallel or in sequence, for all satellites in the constellation (e.g., all planes and slots), or a subset thereof.

FIG. 7 is a flow diagram illustrating a second process flow 700, illustrating an subsequent parameter estimation process for determining an accurate long-term model, according to some embodiments, which can follow the initial process illustrated in FIG. 6. Again, the operations illustrated in this second process flow 700 may be performed by a server to determine a model for satellite control box prediction for all satellites in the constellation. Unlike the first process flow 600 of FIG. 6, which indicated a process used to estimate orbital parameter values for each control box or satellite (e.g., one at a time), the second process flow 700 may be performed to determine final orbital parameter values for all control boxes or satellites of a satellite constellation (illustrated in FIG. 7 as comprising N planes and M slots). That said, as described in further detail hereafter, the second process flow 700 illustrates a parameter estimation process similar, in many ways, to the first process flow 600 of FIG. 6.

As illustrated, the second process flow 700 may comprise obtaining data from the data source of the first process flow 600, including the TLE archive (for all satellites), as indicated at block 705, and parameter values for coordinate rotation ECI to ECEF, as indicated at block 710. This data may be sampled for a second period of time, T2, which may extend over the same time period as T1, but may be longer or shorter. In preliminary implementations, T2 has been selected to be longer than T1. As an example, T1 may comprise the most recent 8 weeks, and T2 may comprise the most recent 24 weeks (including the eight weeks of T1). Similar to the operation at block 615, in FIG. 6, the operations at blocks 715 comprise preparing a uniformly sampled reference orbital data in ECEF for period T2. As illustrated, this is done for all control boxes or satellites. (The sample rate may or may not be the same sample rate as used to prepare the samples for the first process flow 600. It can be different.)

Similar to the first process flow 600, the second process flow may comprise using seed values for and iterative estimation process that find the best fit of orbital parameter values to the data obtained at block 715. Here, however, the parameter values output by the first process flow 600 may be used as seed values for the operations shown in second process flow 700. In particular, as illustrated at blocks 720, the output orbital parameters from first process flow 600 for each control box of the satellite constellation may be used as inputs.

The group of operations in the iterative process illustrated in block 725 may generally follow the iterative process illustrated in block 625 of FIG. 6 to find a set of orbital parameter values. Here, however, the iterative process is performed to find orbital parameter values that result in a best fit the actual orbital data for period T2 (rather than T1), and it is done for multiple satellites (e.g., all satellites in a satellite constellation), and in some embodiments estimates adjustments only to a subset of parameters (e.g., square-root of semi-major axis and mean anomaly only). This is done by estimating, for a subset of orbital parameter of each control box/satellite, a respective adjustment to the respective seed value to determine a respective candidate orbital parameter value, as indicated at blocks 727. These candidate orbital parameter values are then used to calculate a candidate orbital path, as indicated at blocks 730. At blocks 735, the candidate orbital path is then compared with the actual (reference) orbital path prepared at blocks 715, and residuals indicating a difference between the candidate and actual orbital paths are computed.

At block 740, a cost function can be checked for convergence (e.g., whether values of residuals for successive iterations have changed beyond a threshold value). As illustrated, this can be done across all satellites/control boxes. As opposed to the functionality at block 640 of FIG. 6 in step 1, the cost function and residual values in the operations shown at block 740 may apply across an entire group of satellites. If there has not been convergence, then the process of estimating orbital parameter values can be repeated with updated orbital parameter values, estimated as indicated at block 745. However, once the iteration process results in a convergence then the candidate orbital parameter values in the most recent iteration can be used as the final orbital parameter values for the control boxes/satellites. These values are the output of second process flow 700, as indicated at block 750. These final orbital parameter values can be provided by a server to UEs to model satellite movements and accurately predict the location of communication satellites (or, more accurately, their respective control boxes) for satellite-based communication.

The iterative process illustrated in the group of operations in block 725 may be done to further refine values across a particular group. As indicated at block 745, grouping constraints can be applied when adjusting selected parameter values. Groups may be defined based on satellites that may have similar (or ideally the same) value for one or more parameters. For example, with respect to one or more parameters, satellites may be grouped based on orbital plane, orbital shell, satellite constellation, or combination thereof. Grouped parameter value adjustments can then be estimated, as indicated at block 745, and the iterative process can be used to find a best-fit parameter value for an entire group. According to some embodiments, other (non-grouped) parameters can retain their original values as determined in step 1 of the estimation process flow (e.g., illustrated in FIG. 6), or may be further adjusted (e.g., on a per-satellite/control box basis) as desired. Additional details regarding applying grouping constraints are described hereafter with respect to the example values shown in FIGS. 9-11.

Figure 8:
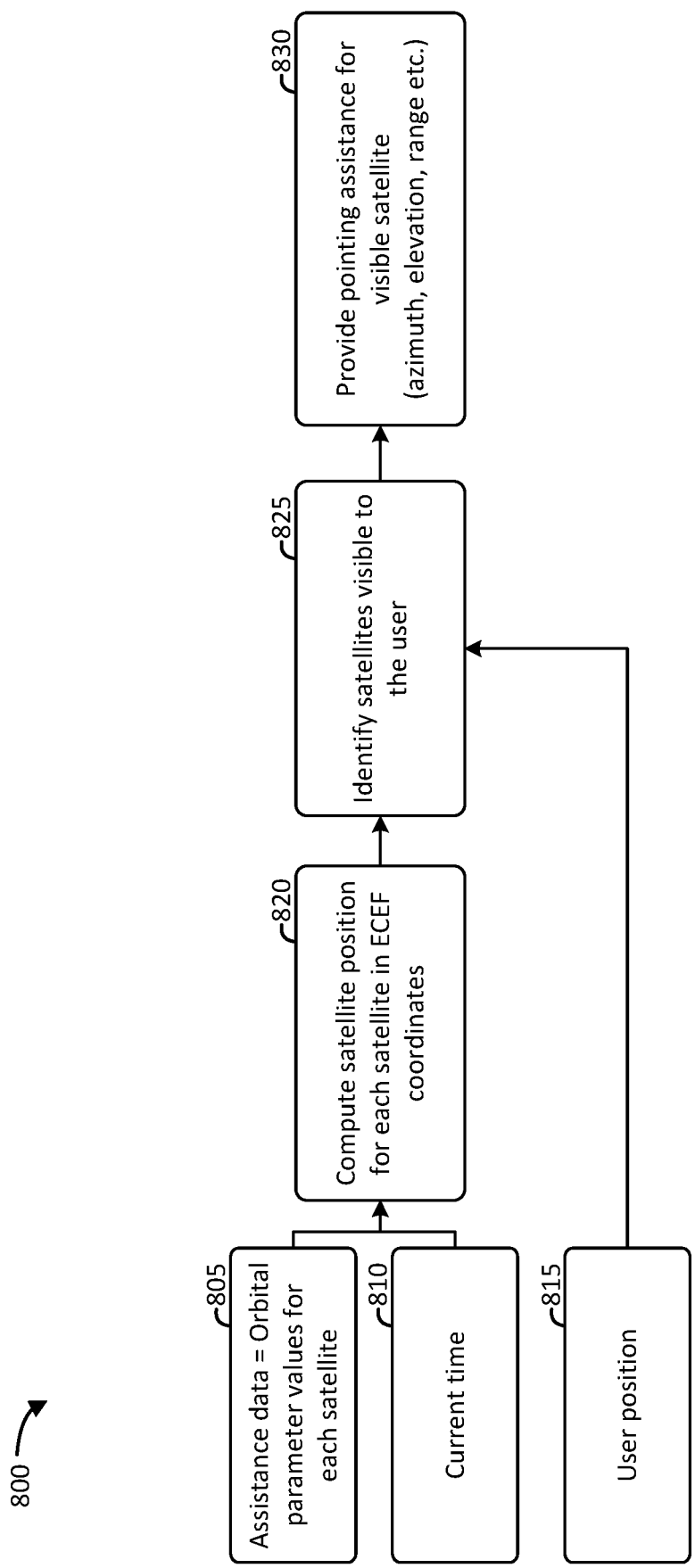
FIG. 8 is a flow diagram of a method that may be utilized by a mobile device to for using assistance data provided by the server to assist a user of the mobile device in orienting the mobile device to enable satellite-based communications, according to some embodiments.

FIG. 8 is a flow diagram of a method 800 that may be utilized by a mobile device for using the assistance data provided by the server to assist a user of the mobile device in orienting the mobile device to enable satellite-based communications, according to some embodiments. As previously noted, the mobile device may comprise a mobile electronic device such as a mobile phone. Other types of mobile devices can include a tablet, laptop, commercial or industrial mobile device, personal media player, headset or other wearable device, or the like.

The method 800 may begin by the mobile device obtaining assistance data (as shown by block 805), a current time (block 810), and a current user position 815. Here, the assistance data may comprise the orbital parameter values determined by the server (e.g., as the output of step 2 of the estimation process flow of FIG. 7) via a data communication network (e.g., via the internet, a cellular wireless network, and/or similar network). The assistance data may have been previously obtained by the mobile device (e.g., when the mobile device was in coverage of a cellular or Wi-Fi network). However, as noted, using the techniques provided herein for determining orbital parameters for control boxes/satellites of a satellite-based communication system, the parameters may enable accurate prediction of control boxes/satellites for a year or more.

The current time obtained at block 810 can be used in the prediction of control boxes/satellites by the mobile device. As such, the current time may be substantially synchronized with the time used for determining the orbital parameter values, to enable an accurate prediction. According to some embodiments, the current time may be obtained by using a GNSS receiver of the mobile device to synchronize the mobile device to the accurate time of a GNSS constellation. In some embodiments, a current time of the mobile device, as maintained by the mobile device's clock, may be sufficiently accurate to enable an accurate prediction of satellite location.

The user position obtained at block 815 also may be obtained in different ways. Again, if the mobile device is equipped with a GNSS receiver, the mobile device can use GNSS positioning. Additionally or alternatively, the mobile device can used terrestrial-based positioning methods (including wireless network-based positioning, if available), dead reckoning (e.g., using sensors of the mobile device), or a combination thereof. To determine an alignment of the mobile device for satellite-based communications, the accuracy of the user position may not need to be highly granular, but may be within a few kilometers of the mobile device's true location.

Using the assistance data and current time obtained at blocks 805 and 810, respectively, the mobile device can then compute the satellite position for each satellite in the constellation of the satellite-based communication system, as indicated at block 820. The orbital parameters can be used, for example, in standard (e.g., Keplerian, equinoctial, etc.) orbital models to determine (or predict) satellite position for the current time.

The functionality at block 825 comprises identifying one or more satellites visible to the user (or mobile device). Using the current satellite positions and the current user position, the mobile device can determine the relative position of each satellite to the user, and further determine the satellites above the horizon and visible (e.g., available for direct line-of-sight communications) to the mobile device. This determination may result in data similar to the data shown in FIG. 2, for example.

With the knowledge of which satellites are visible to the user, and the relative position of the satellites, the mobile device can then provide pointing assistance to the user to orient the mobile device in a way to enable the mobile device to engage in satellite-based communications with a satellite. As noted with regard to FIG. 3, this can be done further in view of the direction of the mobile device's main antenna lobe with respect to the mobile device. The pointing assistance can be provided using audio and/or visual prompts using a speaker and/or display of the mobile device. According to some embodiments, the mobile device may further notify the user when the mobile device is properly aligned, prompting the user to stop movement, and allowing the mobile device to engage in communications with the satellite with for it is oriented for communication.

According to some embodiments, the operations shown in one or more of the blocks in FIG. 8 may be repeated during alignment of the mobile device to allow for real-time feedback to the user. For example, determination of satellite position at block 820, the identification of the visible satellites at block 825, and the providing of the pointing assistance at block 830 may be frequently refreshed (e.g., several times per second, once a second, once every few seconds, etc.) to allow the mobile device to guide the user to align the mobile device properly with a satellite, as the satellite moves across the sky. In some embodiments, the mobile device may prompt an alignment that "leads" the satellite, pointing to a position at which the satellite soon will be, to account for the time it may take a user to properly align the mobile device.

FIGS. 9-11 show example Keplerian orbital parameter values based on public information for the Iridium NEXT satellite constellation over specific time periods. It can be noted, however, that the techniques provided herein may be applied to other satellite constellations, and in particular, constellations of other satellite-based communication systems.

FIG. 9 is a table illustrating example Keplerian orbital parameter values generated by performing step 1 of the estimation process flow described previously with regard to FIG. 6 using archived public TLE data for Iridium satellites. To avoid clutter, data from satellites for only two orbital planes (22 satellites) is shown. However, in practice, data from satellites of all six planes may be used. In this particular example, the time period (T1) for which the data corresponds is Nov. 6, 2020, to Dec. 31, 2020, spanning 8 weeks of historical data.

As can be seen, the output comprises a reference epoch time (e.g., timestamp to which the orbital parameters apply), along with values for the Keplerian orbital parameters: square-root of semi-major axis, eccentricity, mean anomaly, inclination angle, RAAN, RAAN rate, and argument of perigee. At this point in the model determination process (e.g., at the output of step one of the estimation process flow), each value of the seven Keplerian orbital is separately determined for each satellite. Thus, each satellite may have a unique set of Keplerian orbital parameter values.

FIG. 10 is a table illustrating a first example set of Keplerian orbital parameter values generated performing step 2 of the estimation process flow described previously with regard to FIG. 7, continuing with the example values of FIG. 9 for generating Keplerian orbital parameter values for Iridium NEXT satellites. Specifically, the values in FIG. 10 were obtained using the Keplerian orbital parameter values of the table in FIG. 9 as seed values, and the time period (T2) for which the TLE data corresponds is Jul. 17, 2020, to Dec. 31, 2020.

As noted, satellites may be grouped such and constraints may be applied on a per-group basis when determining adjustments for different parameter values during step 2 of the estimation process flow, illustrated in FIG. 7. Group-common parameter values may be constant for the entire group. In the example of FIG. 10, for example, different orbital planes define different groups. (Again, only two orbital planes of the six are illustrated in FIG. 10.) Because inclination angle and RAAN are common for the group, common values can be applied for the entire group. As shown in FIG. 10, values for the inclination angle in column 1010 and values for RAAN in column 1020 are the same for all satellites in each group (e.g., each orbital plane).

As noted, according to some embodiments, grouping for some parameters may be applied to groups comprising the entire constellation. Values for the square-root of semi-major axis may be the same for all satellites in the entire constellation. And thus, in the example illustrated in FIG. 10, the values for the square-root of semimajor axis shown in column 1030 are the same for all satellites in the entire constellation.

With these grouping constraints of values in columns 1010, 1020, and 1030, step 2 of the estimation process flow can be utilized to determine a common value (across groups) that is a best fit for all satellites within a group. The value in column 1030 represents a value that best fits the square-root of semimajor axis for all 66 satellites in the constellation for time T2. Similarly, the values in columns 1010 and 1020 represent the best fit for respective values on a per-orbital plane basis for inclination angle and RAAN across all satellites. Mean anomaly values in column 1040 may be different from step 1 and may be unique for each satellite. And thus, step two may further adjust these values for each satellite. (Because mean anomaly describes a satellite position within an orbit, whereas other Keplerian orbital values generally describe the orbit itself, it may make sense to preserve the mean anomaly as a "free" parameter for which values are selected during step 2 on a per-satellite basis. That said, alternative embodiments may utilize additional or alternative Keplerian parameter values as free parameters.) Other values (e.g., eccentricity, RAAN rate, and argument of perigee) do not have any grouping constraints and may retain their original values as determined in step 1 of the estimation process flow (e.g., as illustrated in FIG. 6). Therefore, in this example, step 2 estimates 79 parameter values: 66 values for mean anomaly (for each satellite), 6 values for inclination angle (for each orbital plane), six values for RAAN (again, for each orbital plane), and a single value four square-root of semimajor axis for all satellites.

It can be noted that principles described herein with respect to a satellite-based communication constellation in a single shell can be extended to a satellite-based communication constellation having a plurality of shells. For example, different grouping constraints may be applied to different shells and/or different groups within different shells (e.g., different orbital planes within a shell).

FIG. 11 is a table illustrating a second example set of Keplerian orbital parameter values generated performing step 2 of the estimation process flow. It uses the same data set and time period (T2) as the Keplerian orbital parameter values of FIG. 10. Here, however, the grouping is different. More specifically, there is no grouping done on a per-orbital plane basis. Instead, there is a single constellation-wide group for the square-root of semimajor axis (similar to FIG. 10) resulting in a common value for all satellites in column 1110, and the mean anomaly values shown in column 1120 are estimated for each satellite. Thus, step 2 of the estimation process flow in this example estimates 67 parameter values 66 values for mean anomaly (for each satellite), and a single value four square-root of semimajor axis for all satellites. All other parameter values can remain the same as determined in step 1.

Figure 12:
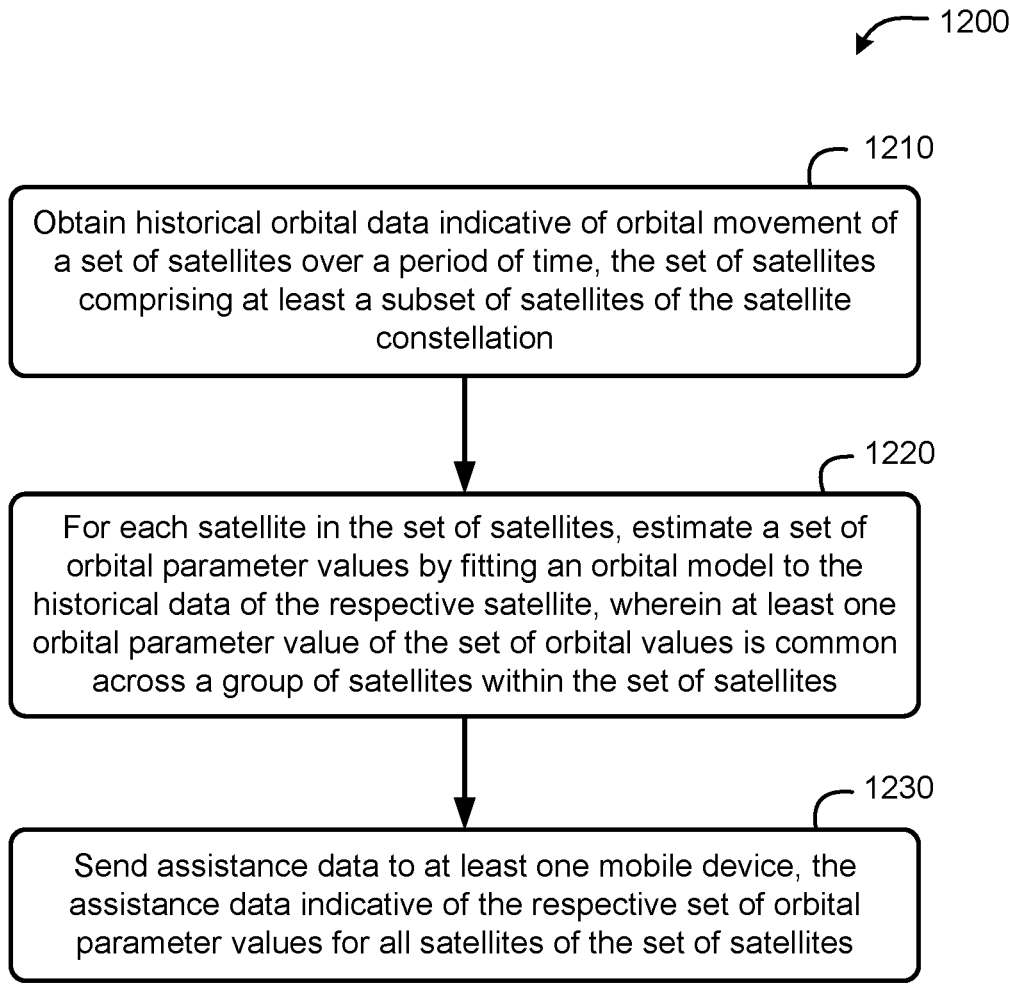
FIG. 12 is a flow diagram of a method of facilitating pointing of a mobile device at a satellite of a satellite constellation for satellite-based data communication, according to an embodiment.
Figure 14:
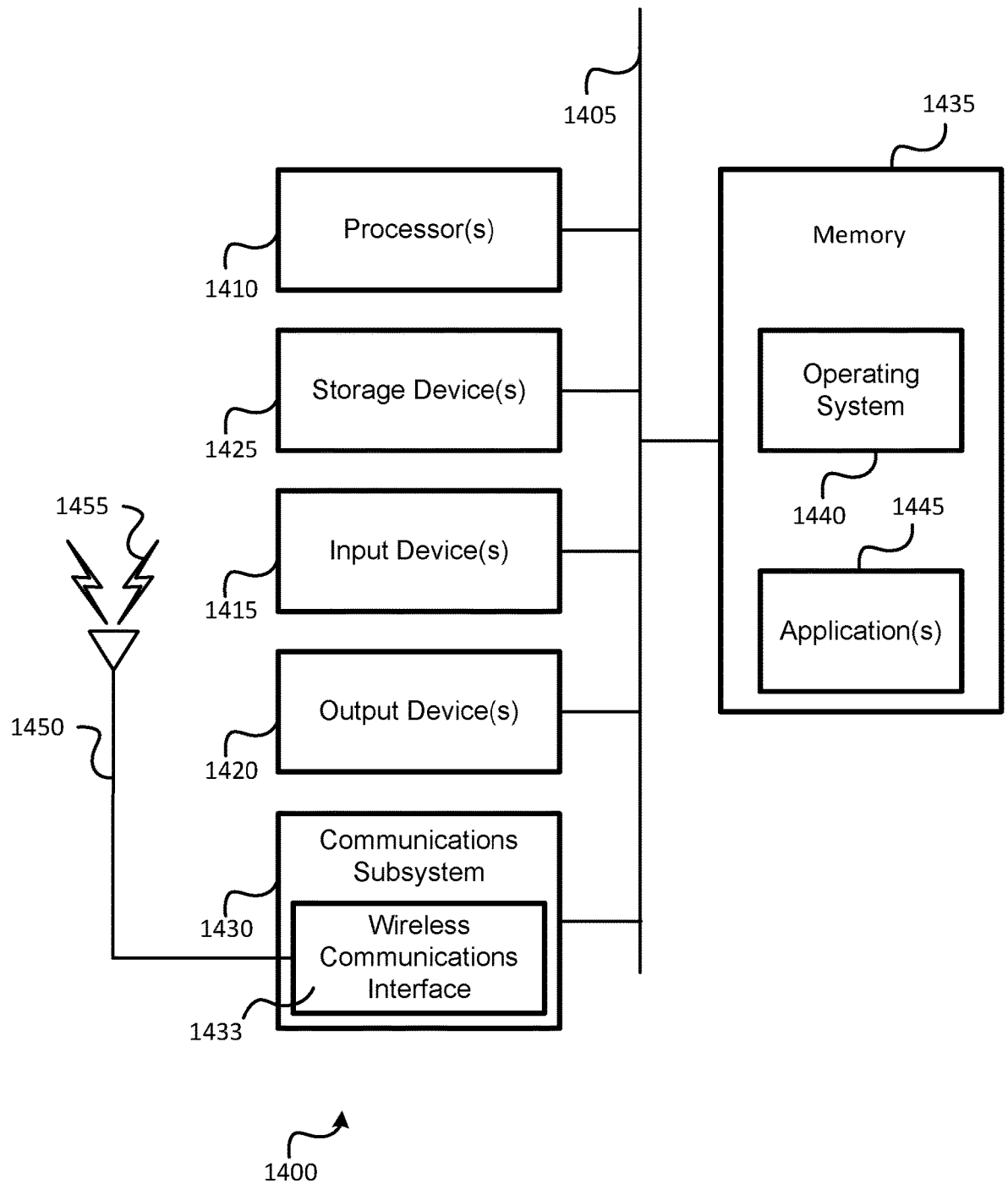
FIG. 14 is a block diagram of an embodiment of a computer system, which can be utilized in embodiments as described herein.

FIG. 12 is a flow diagram of a method 1200 of a method of facilitating pointing of a mobile device at a satellite of a satellite constellation for satellite-based data communication. Means for performing the functionality illustrated in one or more of the blocks shown in FIG. 1200 may be performed by hardware and/or software components of a computer server as described herein. Example components of a computer server are illustrated in FIG. 14, which is described in more detail below. In some embodiments, some or all of the operations in FIG. 12 (and FIGS. 6 and/or 7) may be performed by a mobile device.

At block 1210, the functionality comprises obtaining historical orbital data indicative of orbital movement of a set of satellites over a period of time, the set of satellites comprising at least a subset of satellites of the satellite constellation. In some aspects, this functionality may correspond to the operations at blocks 605, 610, it and 615 of FIG. 6, for example. Accordingly, the period of time may correspond to T1 of FIG. 6. In some embodiments, obtaining the historical orbital data comprises using archived TLE data of the set of satellites for the period of time to compute satellite orbital path at a fixed sampling rate. As described elsewhere herein, the satellite constellation may comprise a communication satellite constellation having satellites capable of communication with terrestrial devices. Each satellite may be subject to station keeping and may correspond with a control box.

Figure 13:
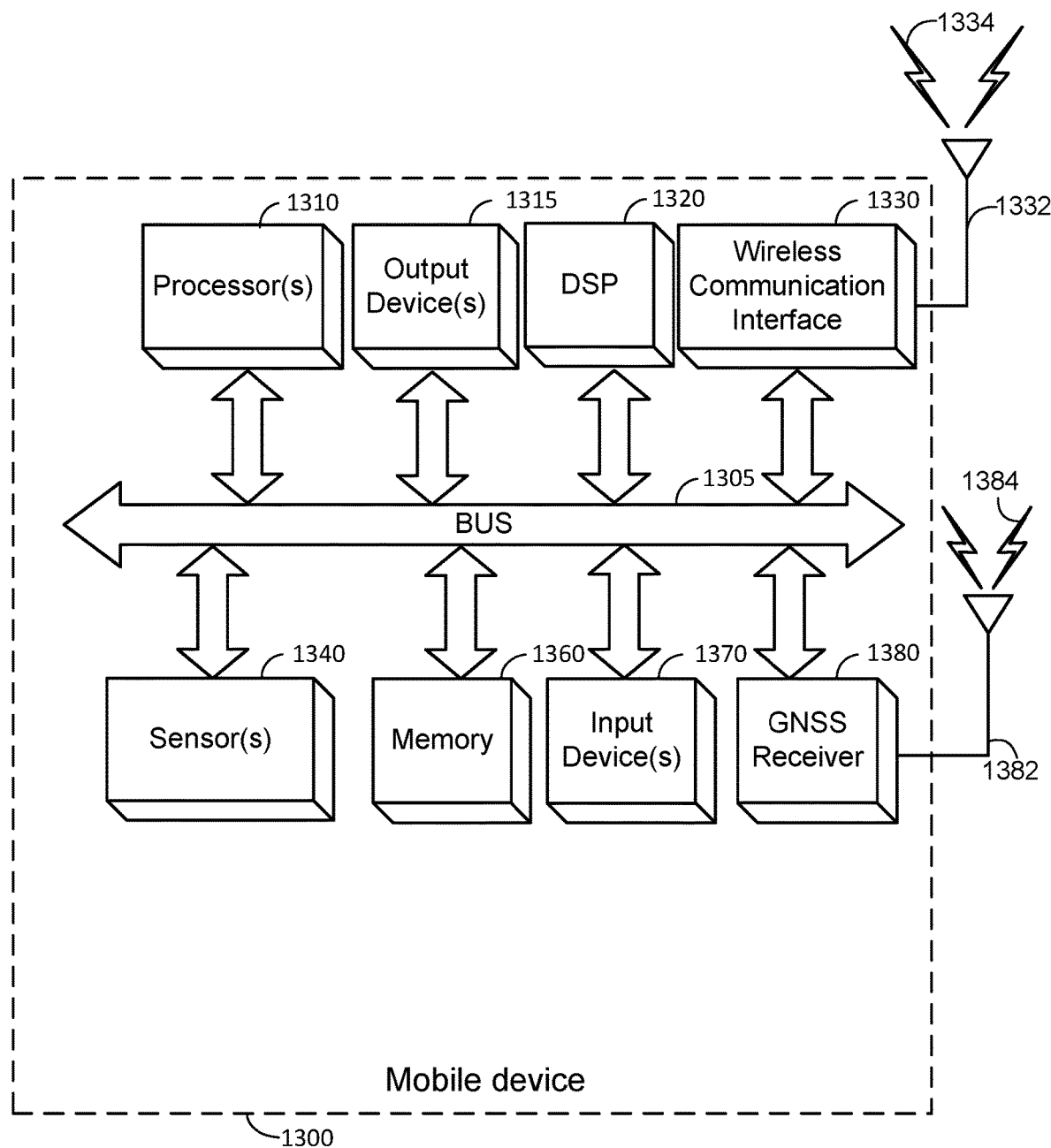
FIG. 13 is a block diagram of an embodiment of a mobile device, which can be utilized in embodiments as described herein.

Means for performing the functionality at block 1210 may comprise, for example, a bus 1305, processor(s) 1310, DSP 1320, wireless communication interface 1330, memory 1360, and/or other components of a mobile device 1300, as illustrated in FIG. 13 and discussed hereafter. Additionally or alternatively, means for performing the functionality block 1210 may comprise, for example, a bus 1405, processors 1410, communications subsystem 1430 (optionally including wireless communications interface 1433), memory 1435, and/or other components of a computer system 1400, as illustrated in FIG. 14 and discussed hereafter.

At block 1220, the functionality comprises, for each satellite in the set of satellites, estimate a set of orbital parameter values by fitting an orbital model to the historical data of the respective satellite, wherein at least one orbital parameter value of the set of orbital values is common across a group of satellites within the set of satellites. As described with respect to FIGS. 6 and 7, the satellite estimation may comprise a two-step estimation process in which an initial or preliminary set of orbital parameter values are determined, then used as seed values for determining a final set of orbital parameter values in which one or more orbital parameter values shared among a group of satellites. Thus, according to some embodiments of the method 1200, fitting the set of orbital parameter values for each satellite may comprise estimating a preliminary set of orbital parameter values in a first operation of fitting the orbital model to a first portion of the historical data spanning a first portion of the period of time, and using the preliminary set of orbital parameter values as seed values in a second operation of fitting the orbital model to a second portion of the historical data, wherein the second portion of the historical data spanning at least the first portion of the period of time. In such embodiments, at least one orbital parameter value common across the group of satellites may be determined by the second operation of fitting the orbital model to the second portion of the historical data. Additionally or alternatively, the historical data spanning the first portion of the period of time may include data spanning one or more steering events for each satellite in the set of satellites.

As noted, satellites that share an orbital parameter value may be grouped in one or more different ways. Thus, the group of satellites referred to in block 1220 may comprise satellites in a common orbital plane, satellites in a common orbital shell, or all satellites of the satellite constellation, or a combination thereof.

Different types of orbital models may be used, which may therefore determine the types of orbital parameter values estimated. According to some embodiments, the orbital model comprises a Keplerian model and the set of orbital parameter values comprises square-root of semi-major axis, eccentricity, mean anomaly, inclination angle, RAAN, RAAN rate, or argument of perigee, or a combination thereof. According to some embodiments, the orbital model comprises a equinoctial model and the set of orbital parameter values comprises semi-major axis, components of an eccentricity vector in an equinoctial reference frame, components of an ascending node vector in the equinoctial reference frame, or mean longitude, or a combination thereof.

Means for performing the functionality at block 1220 may comprise, for example, a bus 1305, processor(s) 1310, DSP 1320, wireless communication interface 1330, memory 1360, and/or other components of a mobile device 1300, as illustrated in FIG. 13 and discussed hereafter. Additionally or alternatively, means for performing the functionality block 1220 may comprise, for example, a bus 1405, processors 1410, communications subsystem 1430 (optionally including wireless communications interface 1433), memory 1435, and/or other components of a computer system 1400, as illustrated in FIG. 14 and discussed hereafter.

At block 1230, the functionality comprises sending assistance data to at least one mobile device, the assistance data indicative of the respective set of orbital parameter values for all satellites of the set of satellites. As described with respect to FIG. 8, this assistance data may be used by a mobile device to enable the mobile device to determine a satellite location and ultimately provide pointing assistance to a user of the mobile device to enable the mobile device to engage in satellite-based communications with the satellite. Again, because the modeling techniques described herein, including those described in FIGS. 6 and 7 provide accurate long-term orbital models, the receiving mobile device may be able to utilize the assistance data to determine the position of satellites in the constellation for several months, the year, or longer.

Means for performing the functionality at block 1230 may comprise, for example, a bus 1305, processor(s) 1310, DSP 1320, wireless communication interface 1330, memory 1360, and/or other components of a mobile device 1300, as illustrated in FIG. 13 and discussed hereafter. Additionally or alternatively, means for performing the functionality block 1230 may comprise, for example, a bus 1405, processors 1410, communications subsystem 1430 (optionally including wireless communications interface 1433), memory 1435, and/or other components of a computer system 1400, as illustrated in FIG. 14 and discussed hereafter.

FIG. 13 is a block diagram of an embodiment of a mobile device 1300, which can be utilized as described herein above (e.g., in association with FIGS. 1-12). For example, the mobile device 1300 can perform one or more of the functions of the method shown in FIG. 8. It should be noted that FIG. 13 is meant only to provide a generalized illustration of various components, any or all of which may be utilized as appropriate. It can be noted that, in some instances, components illustrated by FIG. 13 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 13.

The mobile device 1300 is shown comprising hardware elements that can be electrically coupled via a bus 1305 (or may otherwise be in communication, as appropriate). The hardware elements may include a processor(s) 1310 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 1310 may comprise one or more processing units, which may be housed in a single integrated circuit (IC) or multiple ICs. As shown in FIG. 13, some embodiments may have a separate DSP 1320, depending on desired functionality. Location determination and/or other determinations based on wireless communication may be provided in the processor(s) 1310 and/or wireless communication interface 1330 (discussed below). The mobile device 1300 also can include one or more input devices 1370, which can include without limitation one or more keyboards, touch screens, touch pads, microphones, buttons, dials, switches, and/or the like; and one or more output devices 1315, which can include without limitation one or more displays (e.g., touch screens), light emitting diodes (LEDs), speakers, and/or the like.

The mobile device 1300 may also include a wireless communication interface 1330, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the mobile device 1300 to communicate with other devices as described in the embodiments above. The wireless communication interface 1330 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1332 that send and/or receive wireless signals 1334. According to some embodiments, the wireless communication antenna(s) 1332 may comprise a plurality of discrete antennas, antenna arrays, or any combination thereof. The antenna(s) 1332 may be capable of transmitting and receiving wireless signals using beams (e.g., Tx beams and Rx beams). Beam formation may be performed using digital and/or analog beam formation techniques, with respective digital and/or analog circuitry. The wireless communication interface 1330 may include such circuitry. As shown in FIG. 3, the antenna(s) 1332 may further be used for satellite-based communication and may comprise a primary note, which may be pointed a satellite for satellite-based communication, as described herein. According to some embodiments, the orientation of the primary note relative to the body of the device may be known/established by the device manufacturer.

Depending on desired functionality, the wireless communication interface 1330 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile device 1300 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000®, WCDMA, and so on. CDMA2000® includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The mobile device 1300 can further include sensor(s) 1340. Sensor(s) 1340 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the mobile device 1300 may also include a Global Navigation Satellite System (GNSS) receiver 1380 capable of receiving signals 1384 from one or more GNSS satellites using an antenna 1382 (which could be the same as antenna 1332). Positioning based on GNSS signal measurement can be utilized to complement and/or incorporate the techniques described herein. The GNSS receiver 1380 can extract a position of the mobile device 1300, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS), and/or the like. Moreover, the GNSS receiver 1380 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1380 is illustrated in FIG. 13 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 1310, DSP 1320, and/or a processor within the wireless communication interface 1330 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 1310 or DSP 1320.

The mobile device 1300 may further include and/or be in communication with a memory 1360. The memory 1360 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1360 of the mobile device 1300 also can comprise software elements (not shown in FIG. 13), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1360 that are executable by the mobile device 1300 (and/or processor(s) 1310 or DSP 1320 within mobile device 1300). In some embodiments, then, such code and/or instructions can be used to configure and/or adapt a general-purpose computer (or other device) to perform one or more operations in accordance with the described methods.

FIG. 14 is a block diagram of an embodiment of a computer system 1400, which may be used, in whole or in part, to provide the functions of one or more network components as described in the embodiments herein (e.g., data source(s) 530 and/or server 520 FIG. 5). It should be noted that FIG. 14 is meant only to provide a generalized illustration of various components, any or all of which may be utilized as appropriate. FIG. 14, therefore, broadly illustrates how individual system elements may be implemented in a relatively separated or relatively more integrated manner. In addition, it can be noted that components illustrated by FIG. 14 can be localized to a single device and/or distributed among various networked devices, which may be disposed at different geographical locations.

The computer system 1400 is shown comprising hardware elements that can be electrically coupled via a bus 1405 (or may otherwise be in communication, as appropriate). The hardware elements may include processor(s) 1410, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1400 also may comprise one or more input devices 1415, which may comprise without limitation a mouse, a keyboard, a camera, a microphone, and/or the like; and one or more output devices 1420, which may comprise without limitation a display device, a printer, and/or the like.

The computer system 1400 may further include (and/or be in communication with) one or more non-transitory storage devices 1425, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1400 may also include a communications subsystem 1430, which may comprise wireless communication technologies managed and controlled by a wireless communication interface 1433, as well as wired technologies (such as Ethernet, coaxial communications, universal serial bus (USB), and the like). The wireless communication interface 1433 may comprise one or more wireless transceivers that may send and receive wireless signals 1455 (e.g., signals according to 5G NR or LTE) via wireless antenna(s) 1450. Thus the communications subsystem 1430 may comprise a modem, a network card (wireless or wired), an infrared communication device, a wireless communication device, and/or a chipset, and/or the like, which may enable the computer system 1400 to communicate on any or all of the communication networks described herein to any device on the respective network, including a User Equipment (UE), base stations and/or other TRPs, and/or any other electronic devices described herein. Hence, the communications subsystem 1430 may be used to receive and send data as described in the embodiments herein.

In many embodiments, the computer system 1400 will further comprise a working memory 1435, which may comprise a RAM or ROM device, as described above. Software elements, shown as being located within the working memory 1435, may comprise an operating system 1440, device drivers, executable libraries, and/or other code, such as one or more applications 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1425 described above. In some cases, the storage medium might be incorporated within a computer system, such as computer system 1400. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of facilitating pointing of a mobile device at a satellite of a satellite constellation for satellite-based data communication, the method comprising: obtaining historical orbital data indicative of orbital movement of a set of satellites over a period of time, the set of satellites comprising at least a subset of satellites of the satellite constellation; for each satellite in the set of satellites, estimating a set of orbital parameter values by fitting an orbital model to the historical data of the respective satellite, wherein at least one orbital parameter value of the set of orbital values is common across a group of satellites within the set of satellites; and sending assistance data to at least one mobile device, the assistance data indicative of the respective set of orbital parameter values for all satellites of the set of satellites.

Clause 2. The method of clause 1, wherein fitting the set of orbital parameter values for each satellite comprises: estimating a preliminary set of orbital parameter values in a first operation of fitting the orbital model to a first portion of the historical data spanning a first portion of the period of time; and using the preliminary set of orbital parameter values as seed values in a second operation of fitting the orbital model to a second portion of the historical data, wherein the second portion of the historical data spanning at least the first portion of the period of time.

Clause 3. The method of clause 2 wherein at least one orbital parameter value common across the group of satellites is determined by the second operation of fitting the orbital model to the second portion of the historical data.

Clause 4. The method of any one of clauses 2-3 wherein the historical data spanning the first portion of the period of time includes data spanning one or more steering events for each satellite in the set of satellites.

Clause 5. The method of any one of clauses 1-4 wherein the group of satellites comprises: satellites in a common orbital plane, satellites in a common orbital shell, or all satellites of the satellite constellation, or a combination thereof.

Clause 6. The method of any one of clauses 1-5 wherein the orbital model comprises a Keplerian model and the set of orbital parameter values comprises: square-root of semi-major axis, eccentricity, mean anomaly, inclination angle, Right Ascension of Ascending Node (RAAN), RAAN rate, or argument of perigee, or a combination thereof.

Clause 7. The method of any one of clauses 1-6 wherein the orbital model comprises a equinoctial model and the set of orbital parameter values comprises: semi-major axis, components of an eccentricity vector in an equinoctial reference frame, components of an ascending node vector in the equinoctial reference frame, or mean longitude, or a combination thereof.

Clause 8. The method of any one of clauses 1-7 wherein obtaining the historical orbital data comprises uniformly sampling archived Two Line Element (TLE) data of the set of satellites for the period of time.

Clause 9. A device for facilitating pointing of a mobile device at a satellite of a satellite constellation for satellite-based data communication, the device comprising: a transceiver; a memory; and one or more processors communicatively coupled with the transceiver and the memory, wherein the one or more processors are configured to: obtain historical orbital data indicative of orbital movement of a set of satellites over a period of time, the set of satellites comprising at least a subset of satellites of the satellite constellation; for each satellite in the set of satellites, estimating a set of orbital parameter values by fitting an orbital model to the historical data of the respective satellite, wherein at least one orbital parameter value of the set of orbital values is common across a group of satellites within the set of satellites; and send assistance data to at least one mobile device, the assistance data indicative of the respective set of orbital parameter values for all satellites of the set of satellites.

Clause 10. The device of clause 9, wherein the device comprises the mobile device or a computer server.

Clause 11. The device of any one of clauses 9-10 wherein, to fit the set of orbital parameter values for each satellite, the one or more processors are configured to estimate a preliminary set of orbital parameter values in a first operation of fitting the orbital model to a first portion of the historical data spanning a first portion of the period of time; and use the preliminary set of orbital parameter values as seed values in a second operation of fitting the orbital model to a second portion of the historical data, wherein the second portion of the historical data spanning at least the first portion of the period of time.

Clause 12. The device of clause 11 wherein at least one orbital parameter value common across the group of satellites is determined by the second operation of fitting the orbital model to the second portion of the historical data.

Clause 13. The device of any one of clauses 11-12 wherein, to obtain the historical data spanning the first portion of the period of time, the one or more processors are configured to obtain data spanning one or more steering events for each satellite in the set of satellites.

Clause 14. The device of any one of clauses 9-13 wherein the group of satellites comprises: satellites in a common orbital plane, satellites in a common orbital shell, or all satellites of the satellite constellation, or a combination thereof.

Clause 15. The device of any one of clauses 9-14 wherein the orbital model comprises a Keplerian model and the set of orbital parameter values comprises: square-root of semi-major axis, eccentricity, mean anomaly, inclination angle, Right Ascension of Ascending Node (RAAN), RAAN rate, or argument of perigee, or a combination thereof.

Clause 16. The device of any one of clauses 9-15 wherein the orbital model comprises a equinoctial model and the set of orbital parameter values comprises: semi-major axis, components of an eccentricity vector in an equinoctial reference frame, components of an ascending node vector in the equinoctial reference frame, or mean longitude, or a combination thereof.

Clause 17. The device of any one of clauses 9-16 wherein, to obtain the historical orbital data, the one or more processors are configured to uniformly sample archived Two Line Element (TLE) data of the set of satellites for the period of time.

Clause 18. An apparatus for facilitating pointing of a mobile device at a satellite of a satellite constellation for satellite-based data communication, the apparatus comprising: means for obtaining historical orbital data indicative of orbital movement of a set of satellites over a period of time, the set of satellites comprising at least a subset of satellites of the satellite constellation; means for estimating, for each satellite in the set of satellites, a set of orbital parameter values by fitting an orbital model to the historical data of the respective satellite, wherein at least one orbital parameter value of the set of orbital values is common across a group of satellites within the set of satellites; and means for sending assistance data to at least one mobile device, the assistance data indicative of the respective set of orbital parameter values for all satellites of the set of satellites.

Clause 19. The apparatus of clause 18, wherein the means for fitting the set of orbital parameter values for each satellite comprises: means for estimating a preliminary set of orbital parameter values in a first operation of fitting the orbital model to a first portion of the historical data spanning a first portion of the period of time; and means for using the preliminary set of orbital parameter values as seed values in a second operation of fitting the orbital model to a second portion of the historical data, wherein the second portion of the historical data spanning at least the first portion of the period of time.

Clause 20. The apparatus of clause 19 wherein at least one orbital parameter value common across the group of satellites is determined by the second operation of fitting the orbital model to the second portion of the historical data.

Clause 21. The apparatus of any one of clauses 19-20 wherein the means for obtaining the historical data spanning the first portion of the period of time includes means for obtaining data spanning one or more steering events for each satellite in the set of satellites.

Clause 22. The apparatus of any one of clauses 18-21 wherein the group of satellites comprises: satellites in a common orbital plane, satellites in a common orbital shell, or all satellites of the satellite constellation, or a combination thereof.

Clause 23. The apparatus of any one of clauses 18-22 wherein the orbital model comprises a Keplerian model and the set of orbital parameter values comprises: square-root of semi-major axis, eccentricity, mean anomaly, inclination angle, Right Ascension of Ascending Node (RAAN), RAAN rate, or argument of perigee, or a combination thereof.

Clause 24. The apparatus of any one of clauses 18-23 wherein the orbital model comprises a equinoctial model and the set of orbital parameter values comprises: semi-major axis, components of an eccentricity vector in an equinoctial reference frame, components of an ascending node vector in the equinoctial reference frame, or mean longitude, or a combination thereof.

Clause 25. The apparatus of any one of clauses 18-24 wherein the means for obtaining the historical orbital data comprises means for uniformly sampling archived Two Line Element (TLE) data of the set of satellites for the period of time.

Clause 26. A non-transitory computer-readable medium storing instructions for facilitating pointing of a mobile device at a satellite of a satellite constellation for satellite-based data communication, the instructions comprising code for: obtaining historical orbital data indicative of orbital movement of a set of satellites over a period of time, the set of satellites comprising at least a subset of satellites of the satellite constellation; for each satellite in the set of satellites, estimating a set of orbital parameter values by fitting an orbital model to the historical data of the respective satellite, wherein at least one orbital parameter value of the set of orbital values is common across a group of satellites within the set of satellites; and sending assistance data to at least one mobile device, the assistance data indicative of the respective set of orbital parameter values for all satellites of the set of satellites.

Clause 27. The computer-readable medium of clause 26, wherein the code for fitting the set of orbital parameter values for each satellite comprises code for: estimating a preliminary set of orbital parameter values in a first operation of fitting the orbital model to a first portion of the historical data spanning a first portion of the period of time; and using the preliminary set of orbital parameter values as seed values in a second operation of fitting the orbital model to a second portion of the historical data, wherein the second portion of the historical data spanning at least the first portion of the period of time.

Clause 28. The computer-readable medium of clause 27 wherein at least one orbital parameter value common across the group of satellites is determined by the second operation of fitting the orbital model to the second portion of the historical data.

Clause 29. The computer-readable medium of any one of clauses 27-28 wherein the code for obtaining the historical data spanning the first portion of the period of time includes code for obtaining data spanning one or more steering events for each satellite in the set of satellites.

Clause 30. The computer-readable medium of any one of clauses 26-29 wherein the code for obtaining the historical orbital data comprises code for uniformly sampling archived Two Line Element (TLE) data of the set of satellites for the period of time.

What is claimed is:

1. A method of facilitating pointing of a mobile device at a satellite of a satellite constellation for satellite-based data communication, the method comprising:
   obtaining historical orbital data indicative of orbital movement of a set of satellites over a period of time, the set of satellites comprising at least a subset of satellites of the satellite constellation;
   for each satellite in the set of satellites, estimating a set of orbital parameter values by fitting an orbital model to the historical data of the respective satellite, wherein at least one orbital parameter value of the set of orbital values is common across a group of satellites within the set of satellites; and
   sending assistance data to at least one mobile device, the assistance data indicative of the respective set of orbital parameter values for all satellites of the set of satellites.

2. The method of claim 1, wherein fitting the set of orbital parameter values for each satellite comprises:
   estimating a preliminary set of orbital parameter values in a first operation of fitting the orbital model to a first portion of the historical data spanning a first portion of the period of time; and
   using the preliminary set of orbital parameter values as seed values in a second operation of fitting the orbital model to a second portion of the historical data, wherein the second portion of the historical data spanning at least the first portion of the period of time.

3. The method of claim 2, wherein at least one orbital parameter value common across the group of satellites is determined by the second operation of fitting the orbital model to the second portion of the historical data.

4. The method of claim 2, wherein the historical data spanning the first portion of the period of time includes data spanning one or more steering events for each satellite in the set of satellites.

5. The method of claim 1, wherein the group of satellites comprises:
   satellites in a common orbital plane,
   satellites in a common orbital shell, or
   all satellites of the satellite constellation, or
   a combination thereof.

6. The method of claim 1, wherein the orbital model comprises a Keplerian model and the set of orbital parameter values comprises:
   square-root of semi-major axis,
   eccentricity,
   mean anomaly,
   inclination angle,
   Right Ascension of Ascending Node (RAAN),
   RAAN rate, or
   argument of perigee, or
   a combination thereof.

7. The method of claim 1, wherein the orbital model comprises a equinoctial model and the set of orbital parameter values comprises:
   semi-major axis,
   components of an eccentricity vector in an equinoctial reference frame,
   components of an ascending node vector in the equinoctial reference frame, or
   mean longitude, or
   a combination thereof.

8. The method of claim 1, wherein obtaining the historical orbital data comprises uniformly sampling archived Two Line Element (TLE) data of the set of satellites for the period of time.

9. A device for facilitating pointing of a mobile device at a satellite of a satellite constellation for satellite-based data communication, the device comprising:
   a transceiver;
   a memory; and
   one or more processors communicatively coupled with the transceiver and the memory, wherein the one or more processors are configured to:
      obtain historical orbital data indicative of orbital movement of a set of satellites over a period of time, the set of satellites comprising at least a subset of satellites of the satellite constellation;
      for each satellite in the set of satellites, estimate a set of orbital parameter values by fitting an orbital model to the historical data of the respective satellite, wherein at least one orbital parameter value of the set of orbital values is common across a group of satellites within the set of satellites; and
      send assistance data to at least one mobile device, the assistance data indicative of the respective set of orbital parameter values for all satellites of the set of satellites.

10. The device of claim 9, wherein the device comprises the mobile device or a computer server.

11. The device of claim 9, wherein, to fit the set of orbital parameter values for each satellite, the one or more processors are configured to:
   estimate a preliminary set of orbital parameter values in a first operation of fitting the orbital model to a first portion of the historical data spanning a first portion of the period of time; and
   use the preliminary set of orbital parameter values as seed values in a second operation of fitting the orbital model to a second portion of the historical data, wherein the second portion of the historical data spanning at least the first portion of the period of time.

12. The device of claim 11, wherein at least one orbital parameter value common across the group of satellites is determined by the second operation of fitting the orbital model to the second portion of the historical data.

13. The device of claim 11, wherein, to obtain the historical data spanning the first portion of the period of time, the one or more processors are configured to obtain data spanning one or more steering events for each satellite in the set of satellites.

14. The device of claim 9, wherein the group of satellites comprises:
   satellites in a common orbital plane,
   satellites in a common orbital shell, or
   all satellites of the satellite constellation, or
   a combination thereof.

15. The device of claim 9, wherein the orbital model comprises a Keplerian model and the set of orbital parameter values comprises:
   square-root of semi-major axis,
   eccentricity,
   mean anomaly,
   inclination angle,
   Right Ascension of Ascending Node (RAAN),
   RAAN rate, or
   argument of perigee, or
   a combination thereof.

16. The device of claim 9, wherein the orbital model comprises a equinoctial model and the set of orbital parameter values comprises:
   semi-major axis,
   components of an eccentricity vector in an equinoctial reference frame,
   components of an ascending node vector in the equinoctial reference frame, or
   mean longitude, or
   a combination thereof.

17. The device of claim 9, wherein, to obtain the historical orbital data, the one or more processors are configured to uniformly sample archived Two Line Element (TLE) data of the set of satellites for the period of time.

18. An apparatus for facilitating pointing of a mobile device at a satellite of a satellite constellation for satellite-based data communication, the apparatus comprising:
   means for obtaining historical orbital data indicative of orbital movement of a set of satellites over a period of time, the set of satellites comprising at least a subset of satellites of the satellite constellation;
   means for estimating, for each satellite in the set of satellites, a set of orbital parameter values by fitting an orbital model to the historical data of the respective satellite, wherein at least one orbital parameter value of the set of orbital values is common across a group of satellites within the set of satellites; and
   means for sending assistance data to at least one mobile device, the assistance data indicative of the respective set of orbital parameter values for all satellites of the set of satellites.

19. The apparatus of claim 18, wherein the means for fitting the set of orbital parameter values for each satellite comprises:
   means for estimating a preliminary set of orbital parameter values in a first operation of fitting the orbital model to a first portion of the historical data spanning a first portion of the period of time; and
   means for using the preliminary set of orbital parameter values as seed values in a second operation of fitting the orbital model to a second portion of the historical data, wherein the second portion of the historical data spanning at least the first portion of the period of time.

20. The apparatus of claim 19, wherein at least one orbital parameter value common across the group of satellites is determined by the second operation of fitting the orbital model to the second portion of the historical data.

21. The apparatus of claim 19, wherein the means for obtaining the historical data spanning the first portion of the period of time includes means for obtaining data spanning one or more steering events for each satellite in the set of satellites.

22. The apparatus of claim 18, wherein the group of satellites comprises:
   satellites in a common orbital plane,
   satellites in a common orbital shell, or
   all satellites of the satellite constellation, or
   a combination thereof.

23. The apparatus of claim 18, wherein the orbital model comprises a Keplerian model and the set of orbital parameter values comprises:
   square-root of semi-major axis,
   eccentricity,
   mean anomaly,
   inclination angle,
   Right Ascension of Ascending Node (RAAN),
   RAAN rate, or
   argument of perigee, or
   a combination thereof.

24. The apparatus of claim 18, wherein the orbital model comprises a equinoctial model and the set of orbital parameter values comprises:
   semi-major axis,
   components of an eccentricity vector in an equinoctial reference frame,
   components of an ascending node vector in the equinoctial reference frame, or
   mean longitude, or
   a combination thereof.

25. The apparatus of claim 18, wherein the means for obtaining the historical orbital data comprises means for uniformly sampling archived Two Line Element (TLE) data of the set of satellites for the period of time.

26. A non-transitory computer-readable medium storing instructions for facilitating pointing of a mobile device at a satellite of a satellite constellation for satellite-based data communication, the instructions comprising code for:
   obtaining historical orbital data indicative of orbital movement of a set of satellites over a period of time, the set of satellites comprising at least a subset of satellites of the satellite constellation;
   for each satellite in the set of satellites, estimating a set of orbital parameter values by fitting an orbital model to the historical data of the respective satellite, wherein at least one orbital parameter value of the set of orbital values is common across a group of satellites within the set of satellites; and
   sending assistance data to at least one mobile device, the assistance data indicative of the respective set of orbital parameter values for all satellites of the set of satellites.

27. The computer-readable medium of claim 26, wherein the code for fitting the set of orbital parameter values for each satellite comprises code for:
   estimating a preliminary set of orbital parameter values in a first operation of fitting the orbital model to a first portion of the historical data spanning a first portion of the period of time; and using the preliminary set of orbital parameter values as seed values in a second operation of fitting the orbital model to a second portion of the historical data, wherein the second portion of the historical data spanning at least the first portion of the period of time.

28. The computer-readable medium of claim 27, wherein at least one orbital parameter value common across the group of satellites is determined by the second operation of fitting the orbital model to the second portion of the historical data.

29. The computer-readable medium of claim 27, wherein the code for obtaining the historical data spanning the first portion of the period of time includes code for obtaining data spanning one or more steering events for each satellite in the set of satellites.

30. The computer-readable medium of claim 26, wherein the code for obtaining the historical orbital data comprises code for uniformly sampling archived Two Line Element (TLE) data of the set of satellites for the period of time.

* * * * *